United States Patent
Lucky et al.

(10) Patent No.: US 10,841,001 B2
(45) Date of Patent: Nov. 17, 2020

(54) DYNAMICALLY SEGMENTING INFORMATION ACCORDING TO AT LEAST ONE CRITERION

(71) Applicant: QUALCOMM Incorporated, San Diego, CA (US)

(72) Inventors: Kundan Kumar Lucky, Bangalore (IN); Gene Marsh, Encinitas, CA (US); Fatih Ulupinar, San Diego, CA (US); Rohit Kapoor, Bangalore (IN); Rajeev Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/331,957

(22) PCT Filed: Sep. 1, 2017

(86) PCT No.: PCT/US2017/049932
§ 371 (c)(1),
(2) Date: Mar. 8, 2019

(87) PCT Pub. No.: WO2018/052745
PCT Pub. Date: Mar. 22, 2018

(65) Prior Publication Data
US 2019/0222303 A1    Jul. 18, 2019

(30) Foreign Application Priority Data

Sep. 13, 2016  (IN) .............................. 201641031158

(51) Int. Cl.
*H04B 7/185*    (2006.01)
*H04W 28/06*    (2009.01)
(Continued)

(52) U.S. Cl.
CPC ......... *H04B 7/18582* (2013.01); *H04B 7/195* (2013.01); *H04W 28/065* (2013.01);
(Continued)

(58) Field of Classification Search
None
See application file for complete search history.

(56) References Cited

U.S. PATENT DOCUMENTS 5,666,648 A    9/1997   Stuart
6,819,658 B1 *  11/2004  Agarwal ............... H03M 13/29
                                                        370/316
(Continued)

FOREIGN PATENT DOCUMENTS

WO       9918690 A1    4/1999
WO       02101969 A2   12/2002
(Continued)

OTHER PUBLICATIONS

International Search Report and Written Opinion—PCT/US2017/049932—ISA/EPO—dated Dec. 1, 2017.

*Primary Examiner* — Christine T Duong

(57) ABSTRACT

A message may be too long to be sent all at once. For example, there may be a limit on the number of bits that can be transmitted by a device operating in a power-save mode. The disclosure relates in some aspects to sending a message over packet boundaries (e.g., several frames or sub-frames). The disclosure relates in some aspects to segmenting a Broadcast Information Block and sending the resulting segments over broadcast information window boundaries. In some aspects, this information may be sent via overhead channels. To facilitate this segmentation, information about the segmentation may be included in the information sent from the transmitter to the receiver. For example, a first segment may indicate the number of segments and subsequent segments may indicate the segment number.

30 Claims, 20 Drawing Sheets

(51) Int. Cl.
 *H04B 7/195* (2006.01)
 *H04L 12/805* (2013.01)
 *H04L 12/801* (2013.01)

(52) U.S. Cl.
 CPC ............ *H04L 47/14* (2013.01); *H04L 47/365* (2013.01); *Y02D 30/70* (2020.08)

(56) References Cited

U.S. PATENT DOCUMENTS

| | | |
|---|---|---|
| 8,615,271 B2 | 12/2013 | Chuberre et al. |
| 8,780,788 B2 | 7/2014 | Peach et al. |
| 9,369,883 B2 | 6/2016 | Giffin et al. |
| 2002/0031104 A1* | 3/2002 | Griffith ................ H04L 69/164 370/329 |
| 2003/0054816 A1 | 3/2003 | Krebs et al. |
| 2009/0167599 A1 | 7/2009 | Johnson et al. |
| 2015/0222294 A1 | 8/2015 | Eroz et al. |
| 2016/0127060 A1 | 5/2016 | Cross |

FOREIGN PATENT DOCUMENTS

| | | |
|---|---|---|
| WO | 2004107185 A1 | 12/2004 |
| WO | 2014121197 A2 | 8/2014 |

* cited by examiner

DYNAMICALLY SEGMENTING INFORMATION ACCORDING TO AT LEAST ONE CRITERION

CROSS-REFERENCE TO RELATED APPLICATION(S)

This application is the U.S. national stage of PCT patent application number PCT/US17/49932 filed on Sep. 1, 2017, which claims priority to and the benefit of patent application number 201641031158 filed in the India Patent Office on Sep. 13, 2016 the content of each of which is incorporated herein by reference.

INTRODUCTION

Various aspects described herein relate to wireless communication and, more particularly but not exclusively, to communicating segmented information.

Conventional satellite-based communication systems include gateways and one or more satellites to relay communication signals between the gateways and one or more user terminals (UTs). A gateway is an earth station having an antenna for transmitting signals to, and receiving signals from, communication satellites. A gateway provides communication links, using satellites, for connecting a UT to other UTs or users of other communication systems, such as a public switched telephone network, the Internet and various public and/or private networks. A satellite is an orbiting receiver and repeater used to relay information.

A satellite can receive signals from and transmit signals to a UT provided the UT is within the "footprint" of the satellite. The footprint of a satellite is the geographic region on the surface of the earth within the range of signals of the satellite. The footprint is usually geographically divided into "beams," through the use of antennas (e.g., the antennas may be used to create fixed, static beams or may be used to create dynamically adjustable beams through beam-forming techniques). A cell may constitute any forward link frequency within a beam. In the case where each beam uses only one frequency, "cell" and "beam" are interchangeable. Each beam covers a particular geographic region within the footprint. Beams may be directed so that more than one beam from the same satellite covers the same specific geographic region. In addition, beams from multiple satellites may be directed to cover the same geographic region.

Geosynchronous satellites have long been used for communication. A geosynchronous satellite is stationary relative to a given location on the earth. However, because geosynchronous satellites are limited to a geosynchronous orbit (GSO), which is a circle having a radius of approximately 42,164 km from the center of the earth directly above the earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire earth or at least large parts of the earth. In non-geosynchronous satellite-based systems, such as LEO satellite-based systems, the satellites move relative to a communication device (such as a gateway or a UT) on the ground. Accordingly, a need exists for effective techniques for communicating in non-geosynchronous satellite systems and other systems.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: obtain an information block; determine whether to segment the information block based on at least one power mode of a satellite; segment the information block into segments based on the determination; and send the segments.

Another aspect of the disclosure provides a method for communication including: obtaining an information block; determining whether to segment the information block based on at least one power mode of a satellite; segmenting the information block into segments based on the determination; and sending the segments.

Another aspect of the disclosure provides an apparatus configured for communication. The apparatus including: means for obtaining an information block; means for determining whether to segment the information block based on at least one power mode of a satellite; means for segmenting the information block into segments based on the determination; and means for sending the segments.

Another aspect of the disclosure provides a non-transitory computer-readable medium storing computer-executable code, including code to: obtain an information block; determine whether to segment the information block based on at least one power mode of a satellite; segment the information block into segments based on the determination; and send the segments.

In one aspect, the disclosure provides an apparatus configured for communication that includes a memory and a processor coupled to the memory. The processor and the memory are configured to: obtain an information block; determine whether to segment the information block based on at least one location of a satellite; segment the information block into segments based on the determination; and send the segments.

Another aspect of the disclosure provides a method for communication including: obtaining an information block; determining whether to segment the information block based on at least one location of a satellite; segmenting the information block into segments based on the determination; and sending the segments.

Another aspect of the disclosure provides an apparatus configured for communication. The apparatus including: means for obtaining an information block; means for determining whether to segment the information block based on at least one location of a satellite; means for segmenting the information block into segments based on the determination; and means for sending the segments.

Another aspect of the disclosure provides a non-transitory computer-readable medium storing computer-executable code, including code to: obtain an information block; determine whether to segment the information block based on at least one location of a satellite; segment the information block into segments based on the determination; and send the segments.

In one aspect, the disclosure provides an apparatus configured for communication that includes a memory and a processor coupled to the memory. The processor and the memory are configured to: determine segmentation for a broadcast information block; and communicate the broadcast information block according to the segmentation.

Another aspect of the disclosure provides a method for communication including: determining segmentation for a broadcast information block; and communicating the broadcast information block according to the segmentation.

Another aspect of the disclosure provides an apparatus configured for communication. The apparatus including: means for determining segmentation for a broadcast information block; and means for communicating the broadcast information block according to the segmentation.

Another aspect of the disclosure provides a non-transitory computer-readable medium storing computer-executable code, including code to: determine segmentation for a broadcast information block; and communicate the broadcast information block according to the segmentation.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure relate to segmenting information. A message may be too long to be sent all at once. For example, there may be a limit on the number of bits that can be transmitted by a device operating in a power-save mode or at a particular location. The disclosure relates in some aspects to sending a message over packet boundaries (e.g., several frames or sub-frames). The disclosure relates in some aspects to segmenting a Broadcast Information Block (BIB) and sending the resulting segments over broadcast information (BI) window boundaries. In some aspects, this information may be sent via overhead channels. To facilitate this segmentation, information about the segmentation may be included in the information sent from the transmitter to the receiver. For example, a first segment may indicate the number of segments and subsequent segments may indicate the segment number.

The application relates in some aspects to dynamic segmentation based on a particular criterion. For example, a decision of whether or how to segment may be based on a criterion for broadcast data. In some cases, the criterion relates to a power mode or a location of a device (e.g., a satellite). For example, segmentation may be enabled or disabled by the network based on which power mode a satellite is in (e.g., segmentation may be enabled when the satellite is in a power-save mode) or based on where the satellite is located (e.g., near the Earth's poles). In some cases, the criterion may relate to an allocated window size. As another example, a network may elect to send all segments during one window if a satellite is in power save mode. In some aspects, the disclosure relates to segmenting overhead messages and sending the segmented overhead messages across multiple subframes (or other boundaries).

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
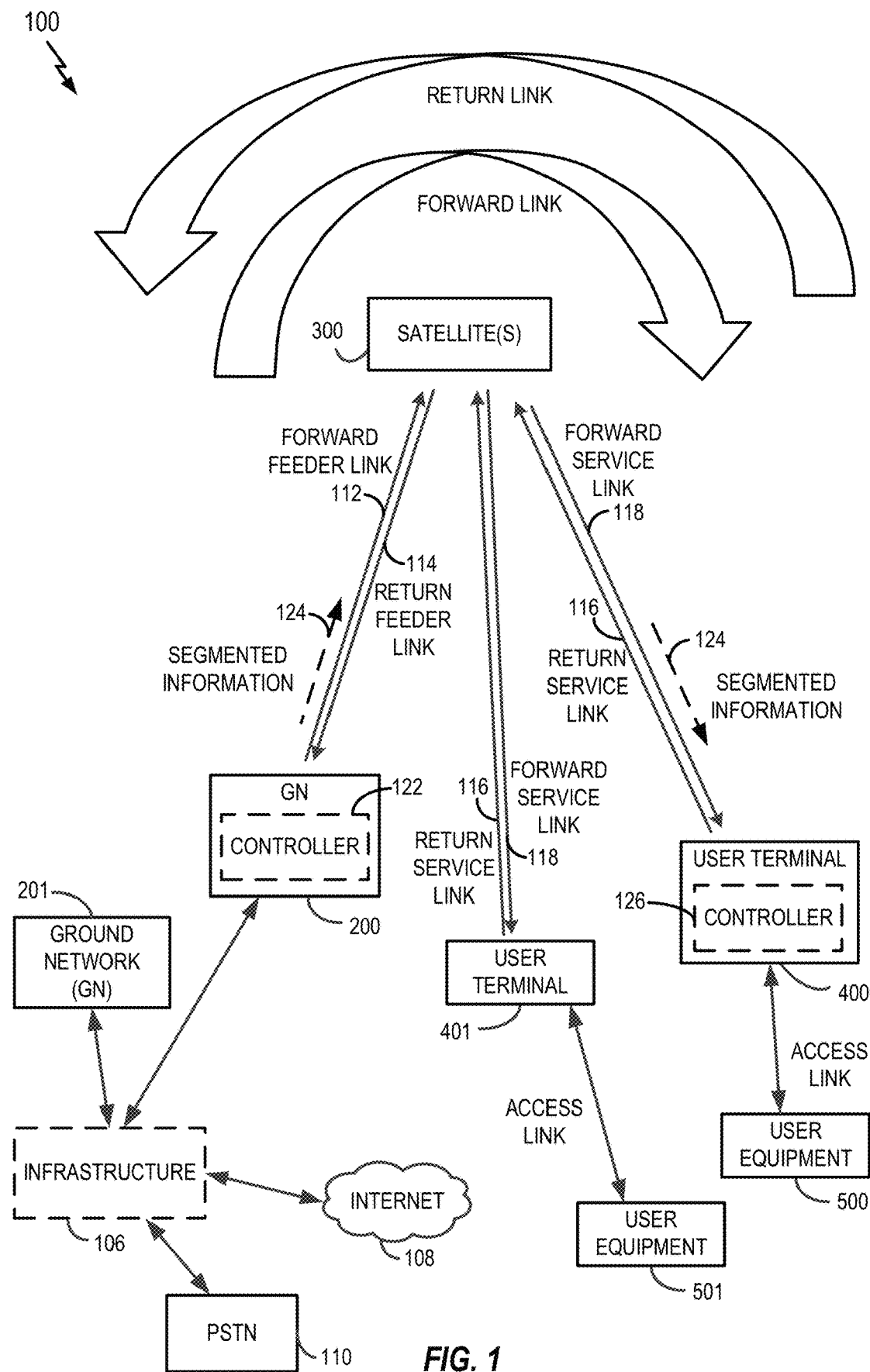
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), a ground network (GN) 200 (e.g., corresponding to a satellite gateway or a satellite network portal) in communication with the satellite 300, a plurality of UTs 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The GN 200 may have access to the Internet 108 or one or more other types of public, semiprivate or private networks. In the example illustrated in FIG. 1, the GN 200 is in communication with infrastructure 106, which is capable of accessing the Internet 108 or one or more other types of public, semiprivate or private networks. The GN 200 may also be coupled to various types of communication backhaul, including, for example, landline networks such as optical fiber networks or public switched telephone networks (PSTN) 110. Further, in alternative implementations the GN 200 may interface to the Internet 108, PSTN 110, or one or more other types of public, semiprivate or private networks without using the infrastructure 106. Still further, the GN 200 may communicate with other GNs, such as the GN 201 through the infrastructure 106 or alternatively may be configured to communicate to the GN 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the GN 200 in both directions are called feeder links, whereas communication between the satellite and each of the UTs 400 and 401 in both directions are called service links. A signal path from the satellite 300 to a ground station, which may be the GN 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the GN 200 and terminating at the UT 400 through the satellite 300 is called a forward link, whereas a communication link in a direction originating from the UT 400 and terminating at the GN 200 through the satellite 300 is called a return link or a reverse link. As such, the signal path from the GN 200 to the satellite 300 is labeled a "Forward Feeder Link" 112 whereas the signal path from the satellite 300 to the GN 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

In accordance with the teachings herein, the satellite communication system 100 communicates segmented information. In some implementations, the GN 200 includes a controller 122 that communicates segmented information and/or determines the segmentation for the information. In some implementations, the controller 122 receives segmented information and forwards the segmented information to the UTs. In some implementations, the controller 122 generates segmented information and forwards the segmented information 124 to the UTs and/or receives segmented information and reassembles the segments. In some implementations, the UT 400 includes a controller 126 that receives segmented information and reassembles the segments and/or that generates and transmits segmented information. Other components of the satellite communication system 100 may include corresponding controllers as well. For example, other SNPs, satellites, and UTs (not shown) may include a corresponding controller.

Figure 2:
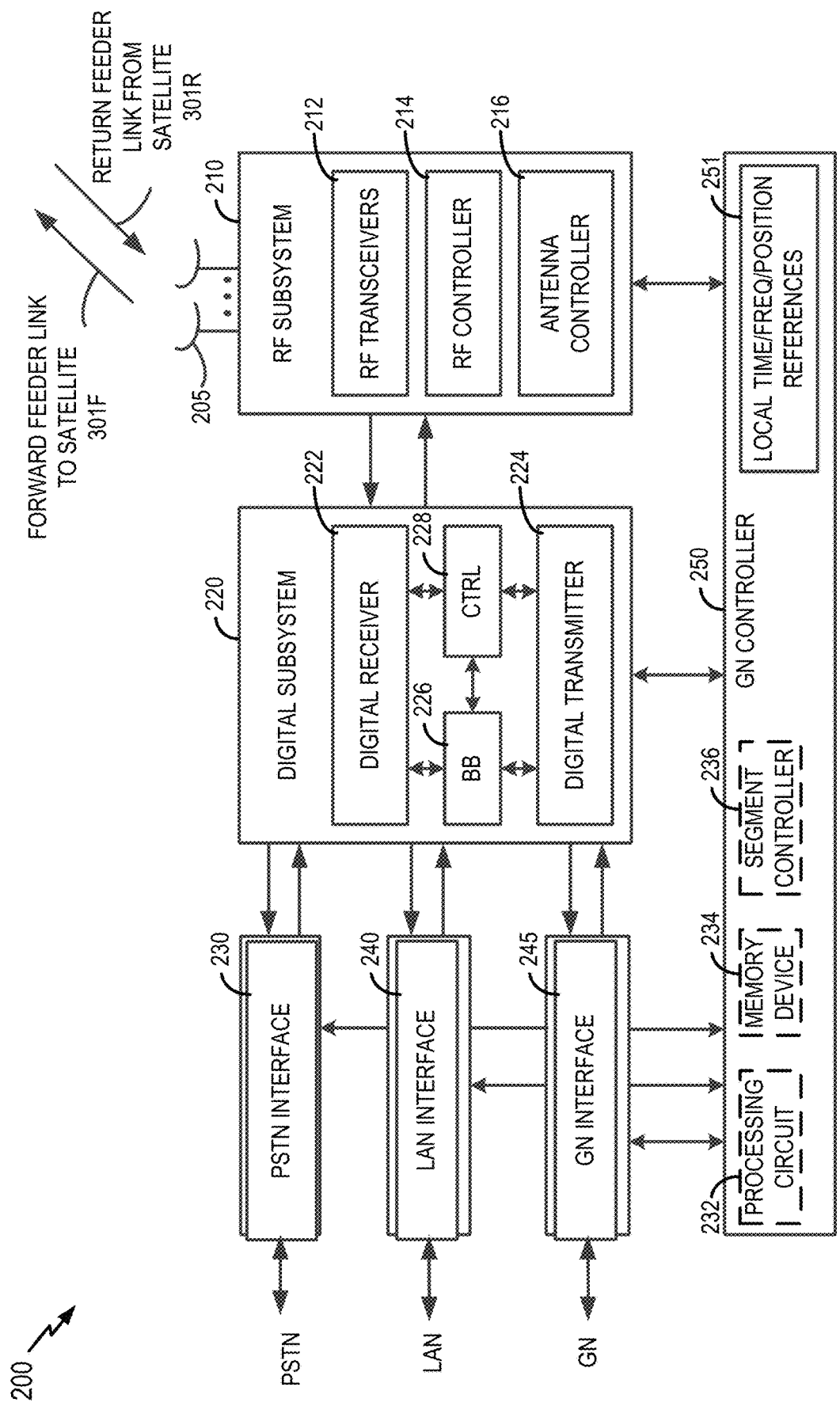
FIG. 2 is a block diagram of one example of a ground network (GN) of FIG. 1 in accordance with some aspects of the disclosure.

FIG. 2 is an example block diagram of the GN 200, which also can apply to the GN 201 of FIG. 1. The GN 200 is shown to include a number of antennas 205, an RF subsystem 210, a digital subsystem 220, a Public Switched Telephone Network (PSTN) interface 230, a Local Area Network (LAN) interface 240, a GN interface 245, and a GN controller 250. The RF subsystem 210 is coupled to the antennas 205 and to the digital subsystem 220. The digital subsystem 220 is coupled to the PSTN interface 230, to the LAN interface 240, and to the GN interface 245. The GN controller 250 is coupled to the RF subsystem 210, the digital subsystem 220, the PSTN interface 230, the LAN interface 240, and the GN interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the GN 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the GN 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The GN interface 245 may provide communication signals to, and receive communication signals from, one or more other GNs associated with the satellite communication system 100 of FIG. 1 (and/or to/from GNs associated with other satellite communication systems, not shown for simplicity). For some implementations, the GN interface 245 may communicate with other GNs via one or more dedicated communication lines or channels (not shown for simplicity). For other implementations, the GN interface 245 may communicate with other GNs using the PSTN 110 and/or other networks such as the Internet 108 (see also FIG. 1). For at least one implementation, the GN interface 245 may communicate with other GNs via the infrastructure 106.

Overall GN control may be provided by the GN controller 250. The GN controller 250 may plan and control utilization of the satellite 300's resources by the GN 200. For example, the GN controller 250 may analyze trends, generate traffic plans, allocate satellite resources, monitor (or track) satellite positions, and monitor the performance of the GN 200 and/or the satellite 300. The GN controller 250 may also be coupled to a ground-based satellite controller (not shown for simplicity) that maintains and monitors orbits of the satellite 300, relays satellite usage information to the GN 200, tracks the positions of the satellite 300, and/or adjusts various channel settings of the satellite 300.

For the example implementation illustrated in FIG. 2, the GN controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the GN 200 with each other and/or with the satellite(s) 300. The local time, frequency, and position references 251 may also provide position information (e.g., ephemeris data) of the satellite(s) 300 to the various components of the GN 200. Further, although depicted in FIG. 2 as included within the GN controller 250, for other implementations, the local time, frequency, and the position references 251 may be a separate subsystem that is coupled to the GN controller 250 (and/or to one or more of the digital subsystem 220 and the RF subsystem 210).

Although not shown in FIG. 2 for simplicity, the GN controller 250 may also be coupled to a network control center (NCC) and/or a satellite control center (SCC). For example, the GN controller 250 may allow the SCC to communicate directly with the satellite(s) 300, for example, to retrieve ephemeris data from the satellite(s) 300. The GN controller 250 may also receive processed information (e.g., from the SCC and/or the NCC) that allows the GN controller 250 to properly aim its antennas 205 (e.g., at the appropriate satellite(s) 300), to schedule beam transmissions, to coordinate handoffs, and to perform various other well-known functions.

The GN controller 250 may include one or more of a processing circuit 232, a memory device 234, or a segment controller 236 that independently or cooperatively perform segmentation-related operations for the GN 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the segment controller 236 is configured (e.g., programmed) to perform some or all of these operations. Although depicted in FIG. 2 as included within the GN controller 250, for other implementations, one or more of the processing circuit 232, the memory device 234, or the segment controller 236 may be a separate subsystem that is coupled to the GN controller 250 (and/or to one or more of the digital subsystem 220 and the RF subsystem 210). In some aspects, one or more of the processing circuit 232, the memory device 234, or the segment controller 236 may correspond to the controller 122 of FIG. 1.

Figure 3:
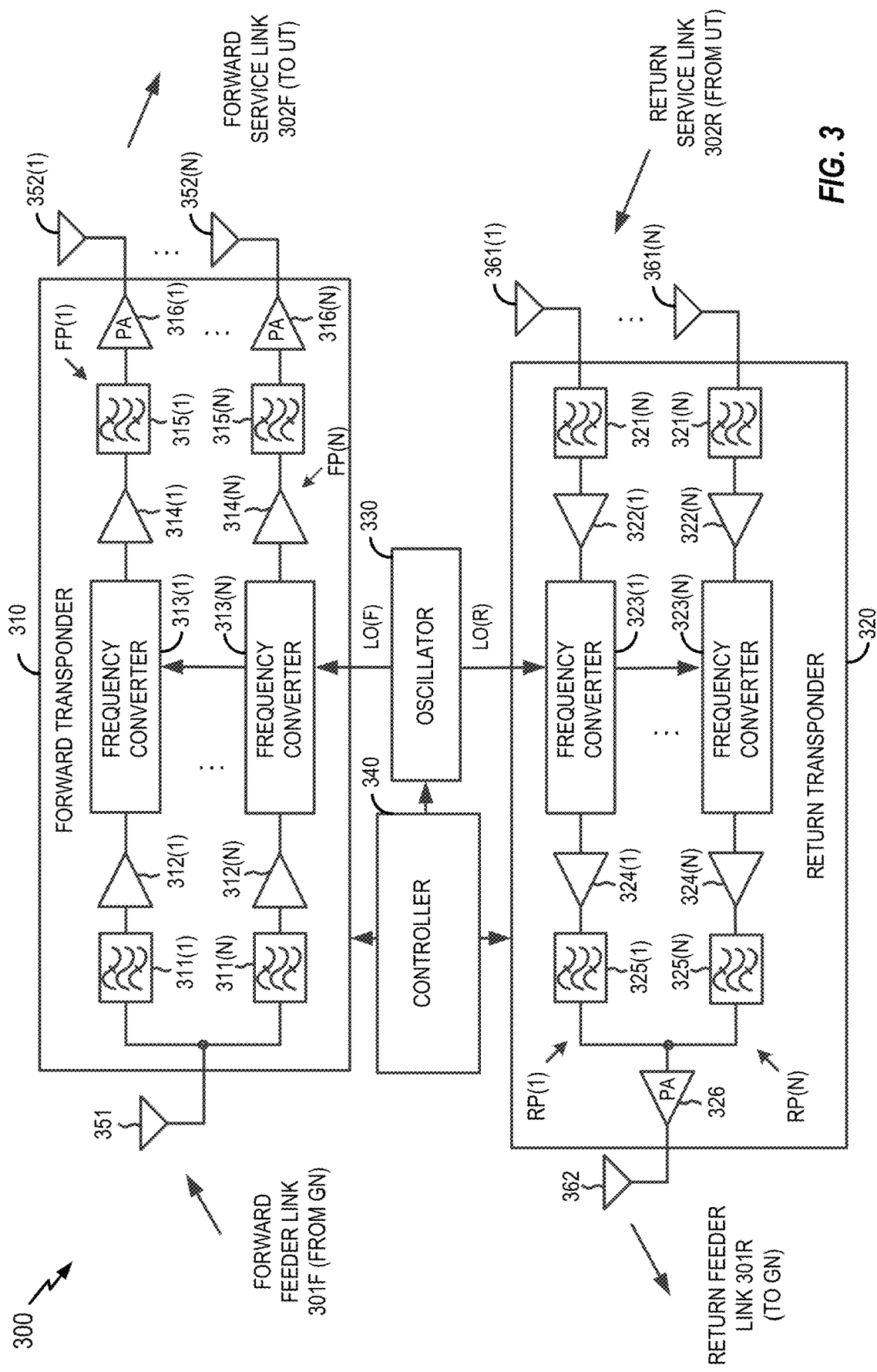
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the GN 200 and the UT 400. It will be appreciated that the disclosure is not limited to any specific satellite configuration and any satellite or combinations of satellites that can provide the functional connection between the GN 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352.

The return transponder 320, which includes a number N of return paths RP(1)-RP(N), receives communication signals from the UT 400 along the return service link 302R via the antennas 361(1)-361(N), and transmits communication signals to the GN 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the GN 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the GN 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the GN 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the GN 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

Figure 4:
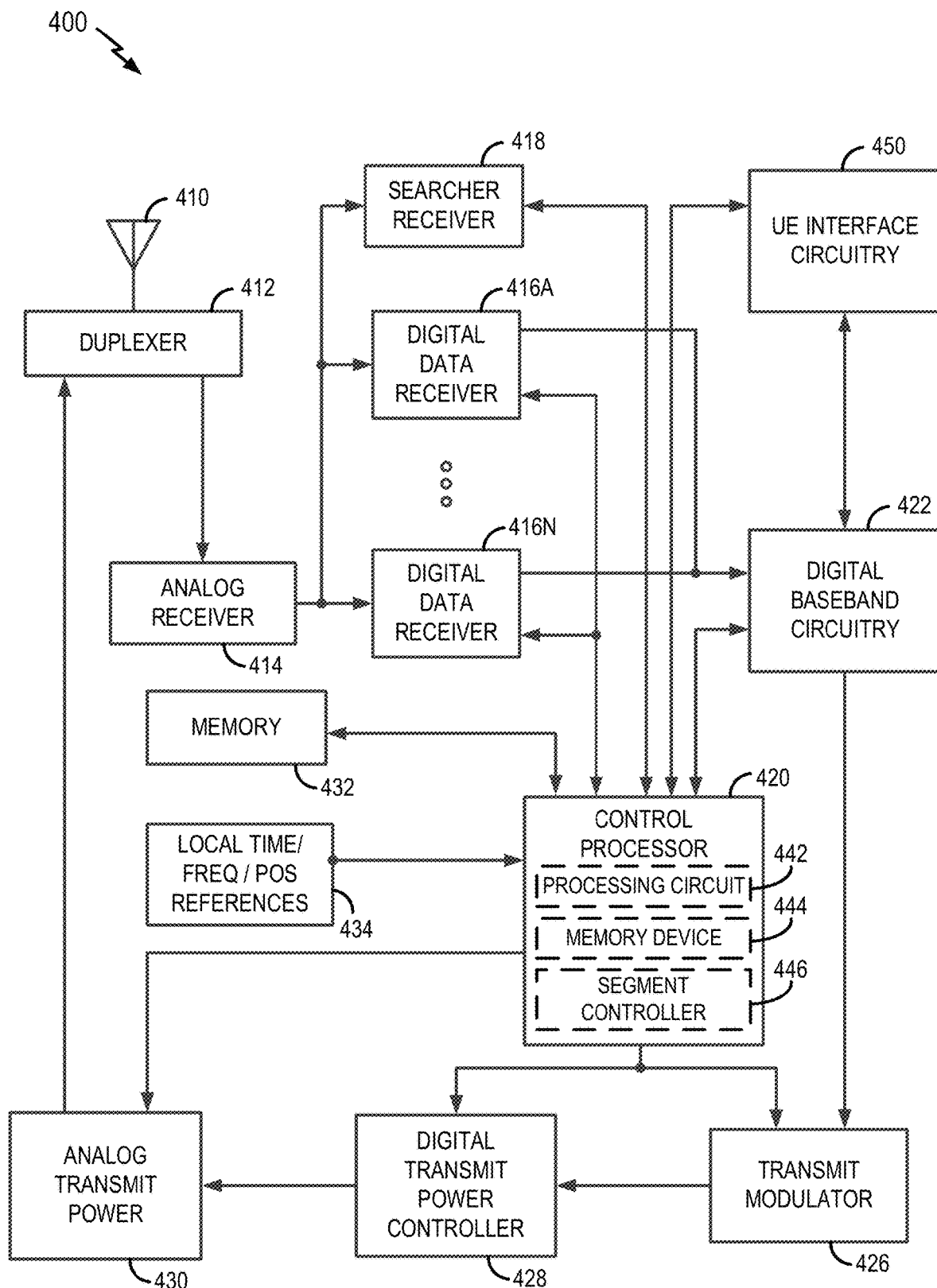
FIG. 4 is a block diagram of one example of a UT of FIG. 1 in accordance with some aspects of the disclosure.

FIG. 4 is an example block diagram of the UT 400 or the UT 401 for illustrative purposes only. It will be appreciated that specific UT configurations can vary significantly. Thus, the disclosure is not limited to any specific UT configuration and any UT that can provide the functional connection between the satellite 300 and the UE 500 or 501 can be considered within the scope of the disclosure.

UTs may be used in various applications. In some scenarios, a UT may provide a cellular backhaul. In this case, the UT may have a relatively large antenna and/or multiple antennas (e.g., to protect against blockage). In some scenarios, a UT may be deployed in an enterprise environment (e.g., placed on the roof of a building). In this case, the UT may have a relatively large antenna and/or multiple antennas (e.g., to provide relatively high backhaul bandwidth). In some scenarios, a UT may be deployed in a residential environment (e.g., placed on the roof of a house). In this case, the UT may have a smaller (and relatively inexpensive) antenna and provide fixed access for data service (e.g., Internet access). In some scenarios, a UT may be deployed in a maritime environment (e.g., placed on a cruise ship, a cargo ship, etc.). In this case, the UT may have a relatively large antenna and/or multiple antennas (e.g., to prevent blockage and provide relatively high bandwidth data service). In some scenarios, a UT may be deployed on a vehicle (e.g., carried by first responders, emergency crews, etc.). In this case, the UT may have a smaller antenna and used to provide temporary Internet access to a particular area (e.g., where cellular service is out). Other scenarios are possible.

The configuration of a particular UT may depend on the application for which the UT will be used. For example, the type of antenna, the antenna shape, the quantity of antennas, the supported bandwidth, the supported transmit power, the receiver sensitivity, etc., may depend on the corresponding application. As one example, a flat panel antenna (with a relatively low profile) may be used for aircraft applications.

In the example of FIG. 4, the UT is shown to include a transceiver where at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a segment controller 446 that independently or cooperatively perform segmentation-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the segment controller 446 is configured (e.g., programmed) to perform some or all of these operations. Although depicted in FIG. 4 as included within the control processor 420, for other implementations, one or more of the processing circuit 442, the memory device 444, or the segment controller 446 may be a separate subsystem that is coupled to the control processor 420. In some aspects, one or more of the processing circuit 442, the memory device 444, or the segment controller 446 may correspond to the controller 126 of FIG. 1.

Figure 5:
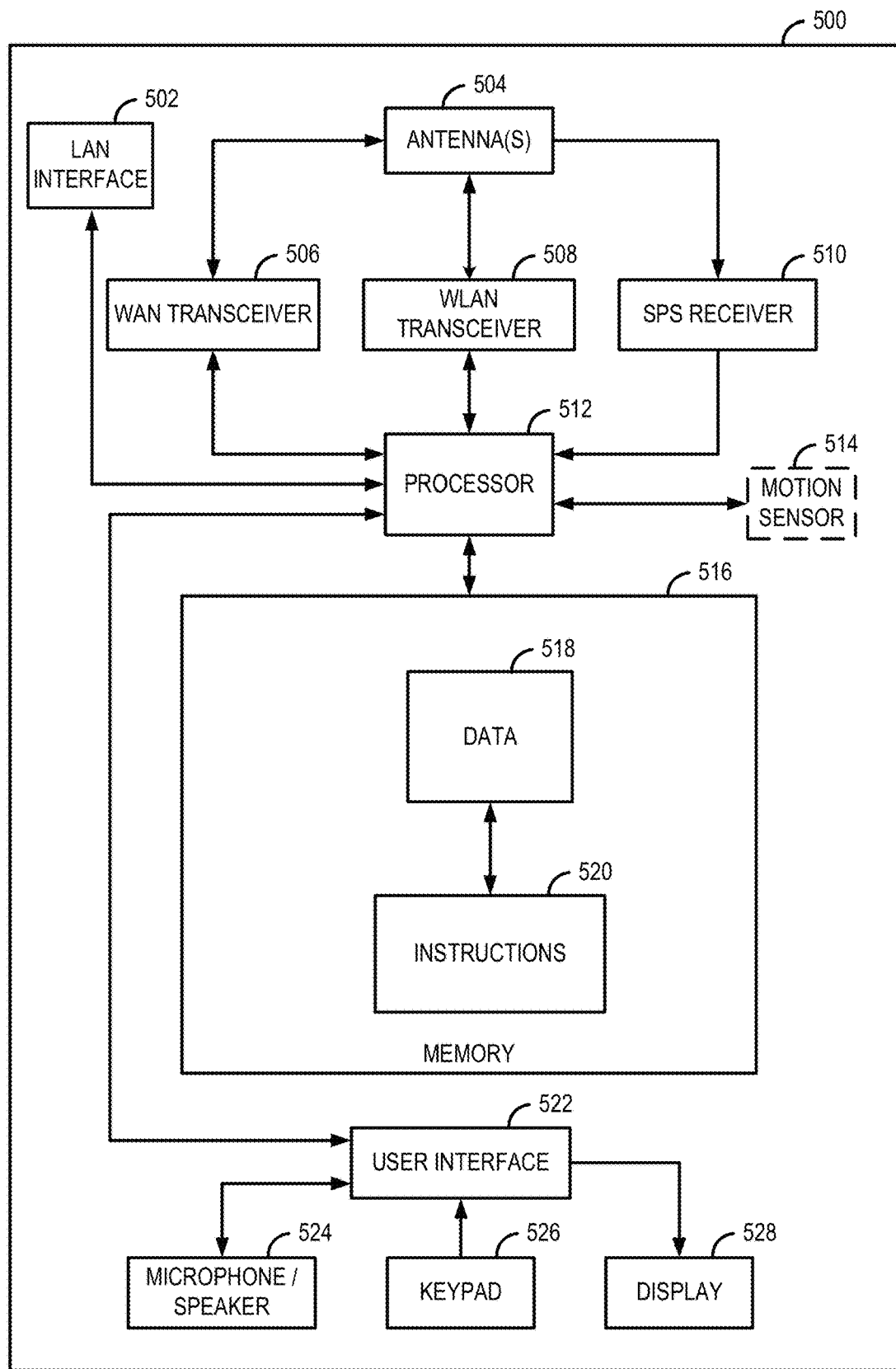
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the GN's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in a GN. Thus, a GN may have several NACs (e.g., implemented by the GN controller 250 of FIG. 2), each of which controls a corresponding one of the satellites controlled by the GN. In addition, a given satellite may support multiple beams Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Example Segmented Communication

Figure 6:
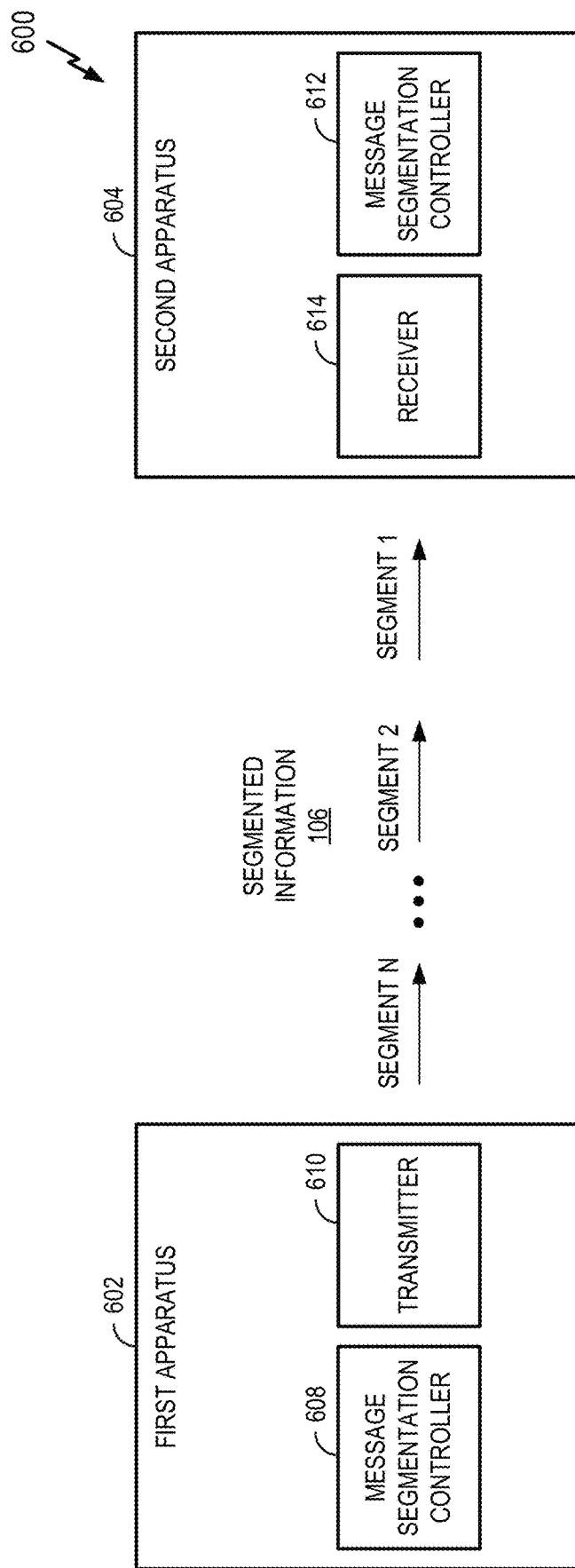
FIG. 6 is a block diagram illustrating example transmitter and receiver devices in accordance with some aspects of the disclosure.

The disclosure relates in some aspects to segmenting information for communication. FIG. 6 illustrates a communication system 600 where a first apparatus 602 communicates with a second apparatus 604. In accordance with the teachings herein, information 606 transmitted by the first apparatus 602 to the second apparatus may be segmented in some scenarios. To this end, the first apparatus 602 includes a message segmentation controller 608 that determines how information (e.g., a BIB) to be transmitted by a transmitter 610 is to be segmented. Similarly, the second apparatus 604 includes a message segmentation controller 612 that determines how information (e.g., a BIB) to be received by a receiver 614 will be segmented. In some implementations, the first apparatus 602 and the second apparatus 604 may correspond to the GN 200 or 201 or the UT 400 or 401, respectively.

Figure 7:
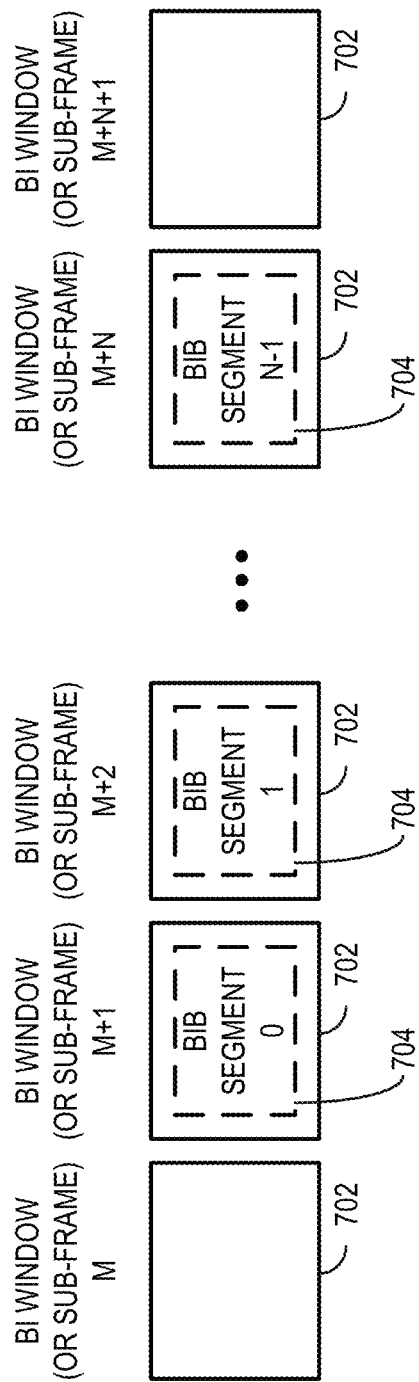
FIG. 7 is a diagram illustrating an example of segmentation in accordance with some aspects of the disclosure.

FIG. 7 illustrates an example segmentation. A BIB that is too large to be transmitted during a single BI window 702 (e.g., a single sub-frame, a single frame, or some other boundary) is segmented into N segments 704 (segment 0 to segment N−1). Each segment 704 is then sent via a designated BI window 702 (e.g., a sub-frame, etc.).

Example Segmentation for Satellite Communication

Figure 8:
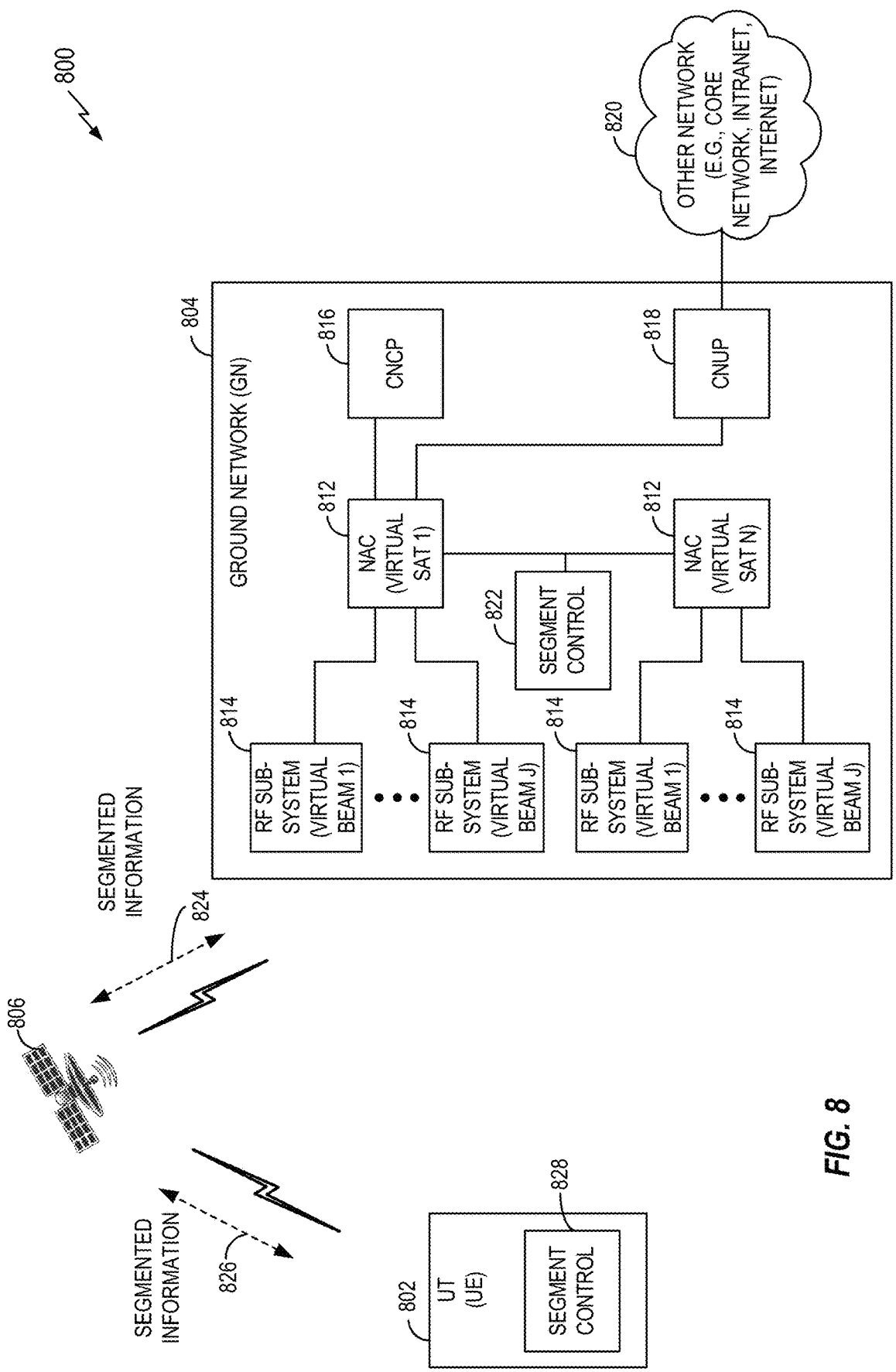
FIG. 8 is a block diagram of an example satellite communication system in accordance with some aspects of the disclosure.

The disclosure relates in some aspects to segmenting information that is communicated via one or more satellites. FIG. 8 illustrates a UT 802 in communication with a GN 804 via a satellite 806 in a non-geosynchronous satellite communication system 800, such as a LEO satellite communication system for data, voice, video, or other communication. The UT 802, the GN 804, and the satellite 806 may respectively correspond to, for example, the UT 400, the GN 200, and the satellite 300 of FIG. 1.

The GN 804 includes network access controllers (NACs) 812, each of which interfaces with one or more radio frequency (RF) subsystems 814 for communicating with the UT 802 and other UTs (not shown) via the satellite 806 (or some other satellite, not shown). The GN 804 also includes a core network control plane (CNCP) 816 and a core network user plane (CNUP) 818, or other similar functionality, for communicating with another network 820. The network 820 may represent, for example, one or more of a core network (e.g., 3G, 4G, 5G, etc.), an intranet, or the Internet.

The GN 804 includes functionality for segment control 822 to divide a block of information into segments. The GN may then broadcast or unicast the segmented information to the UT 802 via messages 824 and 826 relayed by the satellite 806. The UT 802 includes functionality for segment control 828 to process and reassemble the received segments. Segmentation could also be used in the reverse link direction. In various implementations, the information to be segmented may include a neighbor cell list and/or ephemeris information for one or more satellites.

Neighbor Cell List

In an example non-geosynchronous satellite communication system implementation, satellites move over the earth in ascending or descending paths (e.g., approximately a north-south or south-north direction). The rotation of the earth causes an apparent motion in the east-west direction. Each UT obtains the expected path of the satellites (satellite information) that the UT is going to see for some prescribed period of time in the future so that it can establish radio connections to the satellites. In some aspects, the UT can receive this satellite information via a broadcast message and/or a unicast message from the network (e.g., from a GN). To this end, The network may send a neighbor cell list (NCL) to a UT so the UT can readily locate nearby satellites. In an example implementation, the elements of an NCL may include a number of satellites, a number of beams, a segment count, sequence numbers, and on-schedule entries.

In some aspects, the UT can request this satellite information if it is not available and has not been provided to the UT by the network in reasonable time. The disclosed implementations may work at all longitude and latitude values, including satellite constellation designs where satellites in adjacent planes are moving in opposite directions. The disclosed implementations may also provide for unambiguous storage of the NCL and satellite ephemeris information and discard of this information if it becomes stale.

Satellite Ephemeris Information

In an example implementation, the ephemeris information for one satellite consists of the eight elements that follow. Other sets of information and/or other field lengths may be used in other implementations. A Satellite Identifier Number (Id) uniquely identifies a satellite within the system. An Epoch Time (TO) indicates the predictive fit-time for the satellite. It is the GPS time in seconds with t0 set to 00:00:00 on 1 Jan. 1980. A Semi-Major Axis (a) indicates the length of the semi-major axis of the elliptical path of the satellite in meters. Eccentricity (e) indicates the eccentricity of the elliptical path of the satellite. Argument of Perigee (w) indicates the argument of the perigee of the path of the satellite. Inclination (i) indicates the inclination of the path of the satellite. Right Ascension of Ascending Node (Ω or Omega) indicates the right ascension of the ascending node. Mean Anomaly at Epoch (MO) indicates the mean anomaly at the epoch time.

Example Segmented BIBs

Broadcast Information Blocks (BIBs) carry system information to the UTs (and/or UEs) in a cell. The BIBs are carried in Broadcast Information (BI) messages. A BI message may carry one or more BIBs. A BI message may be transmitted in a single Broadcast Information window (BI window), occurring periodically. The BI windows do not overlap. In some implementations, a Broadcast Information Block 1 (referred to herein as BIB1) may be transmitted at a fixed schedule in subframe #5 of every even numbered radio frame and that sub-frame is then not used for transmitting any other BI message.

Figure 9:
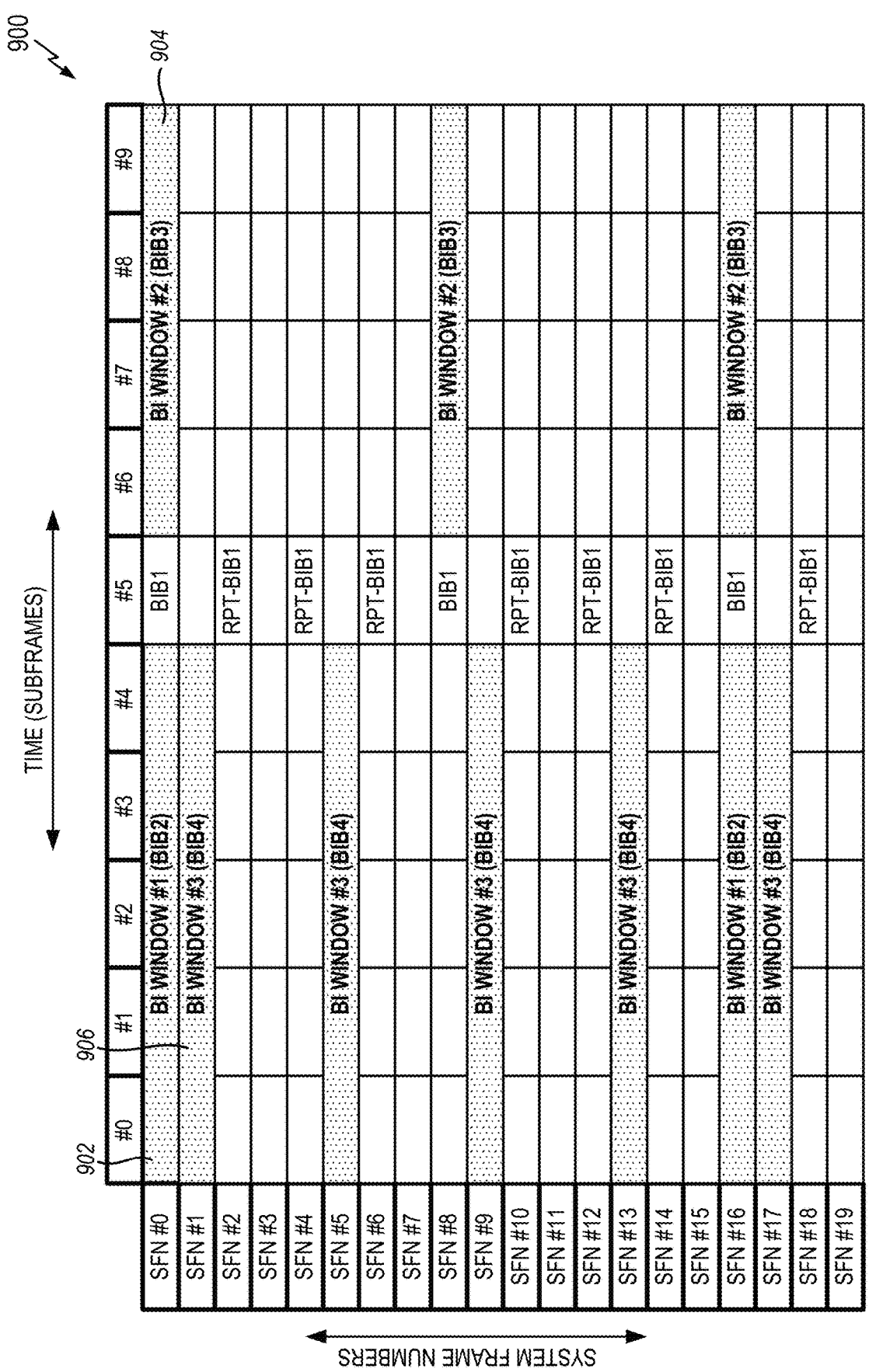
FIG. 9 is a diagram illustrating example scheduling over sub-frames in accordance with some aspects of the disclosure.

FIG. 9 shows an example BIB schedule (structure) with three BI windows (e.g., BI window size=5 milliseconds, ms). A BI window #1 (e.g., the BI window #1 902) carries a Broadcast Information Block 2 (referred to herein as BIB2) with a periodicity of 160 ms in an example implementation. A BI window #2 (e.g., the BI window #2 904) carries a Broadcast Information Block 3 (referred to herein as BIB3) with a periodicity of 80 ms in an example implementation. A BI window #3 (e.g., the BI window #3 906)

carries a Broadcast Information Block 4 (referred to herein as BIB4) with a periodicity of 40 ms in an example implementation.

Neighbor cell list information may be carried in a BIB4 message. For example, the BIB4 may contain information about all of the neighbor cells that are candidates for next cell reselection for all of the UTs under the footprint of a broadcasting beam/cell. A UT may read BIB4 in IDLE mode and in CONNECTED mode.

Ephemeris information may be carried in a Broadcast Information Block E message (referred to herein as BIBe) and a Radio Ephemeris Information Response message from a network. A UT may read BIBe in IDLE mode and in CONNECTED mode.

In a power save mode and other situations, the available radio resources might not be enough to carry the whole BIB contents, especially for the larger BIBs. Therefore, there may be a need to segment the BIBs.

In some aspects, the overall system information broadcast solution described herein may be used for a power save mode of a device (e.g., a user equipment, a satellite, etc.) or other operational scenarios when only a limited set of resources are available and a large BIB may have to be segmented. In addition, larger Broadcast Information (BI) windows may be employed for larger BIBs. Furthermore, rules are specified for re-assembly of BIB segments across BI windows.

Figure 10:
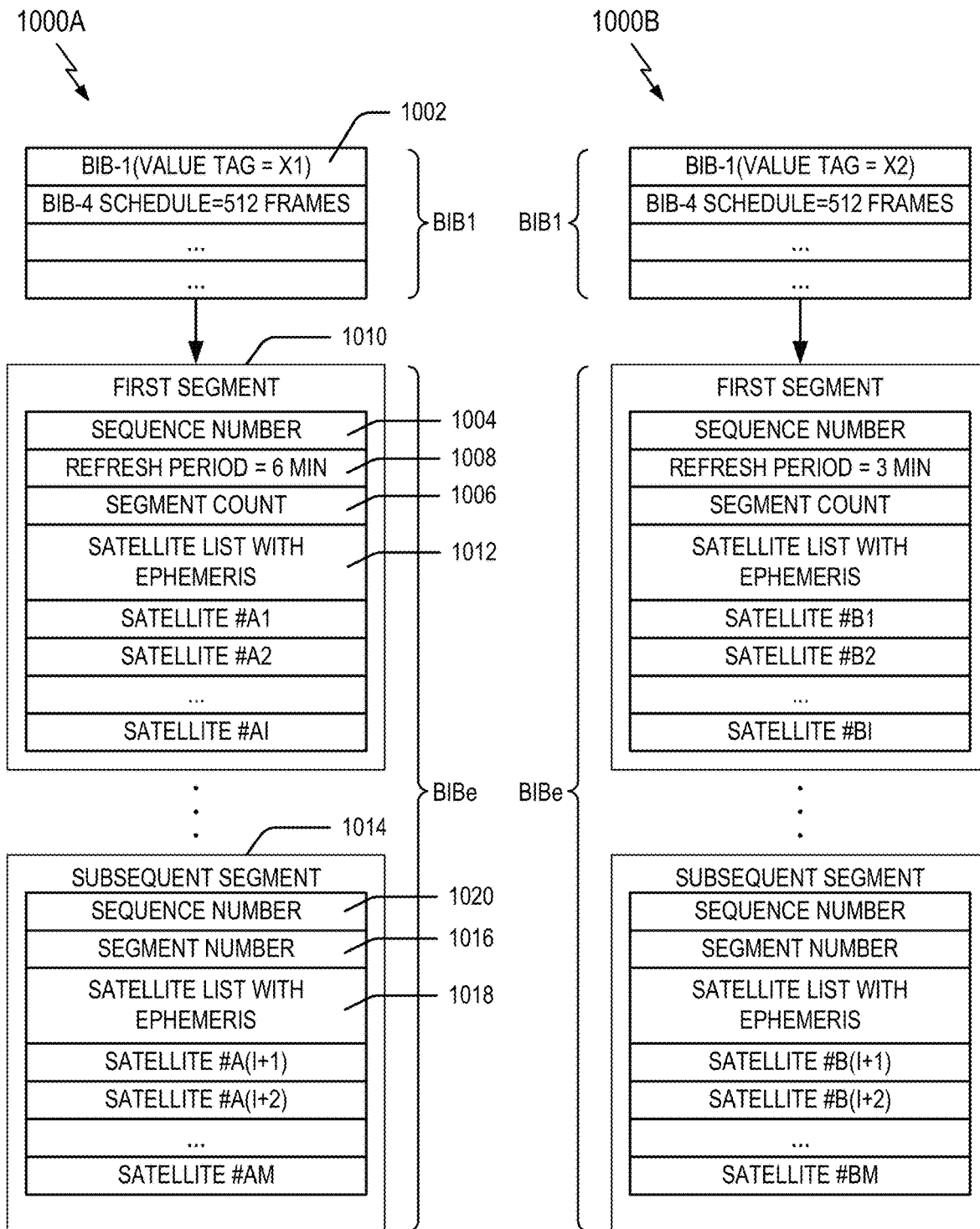
FIG. 10 is a diagram illustrating an example of segmented messages in accordance with some aspects of the disclosure.

The disclosure relates in some aspects to a BIB segmentations as shown in FIG. 10. The figures provided here are only for illustration; different information and/or parameter values may be used in different implementations. For example, the teachings herein are equally applicable to segmenting BIB4 (e.g., that carries a neighbor cell list).

FIG. 10 illustrates an example of BIB4 structures 1000A and 1000B for different sizes of beam lists. As indicated, BIBe may follow a Broadcast Information Block Type 1 message (referred to herein as BIB1). A value tag (e.g., the value tag 1002) included in a BIB1 might not change for any updates to BIBe of FIG. 10. In one example, the proposed periodicity of the BIBe is 5.12 seconds.

The BIBe message structure supports segmentation of a satellite list and ephemeris information into multiple self-decodable BIBe segments. A complete set of information (e.g., including ephemeris information) for a set of satellites is marked with a sequence number (e.g., the sequence number 1004). The sequence number is incremented when the contents of the BIBe change. Thus, for example, all of the segments for a particular BIB may include the same sequence number (or some other suitable identifier).

The satellite list is divided into a number of segments depending on, for example, available radio resources. The total number of segments (e.g., a segment count 1006) and a refresh period (e.g., the refresh period 1008) are provided in the first segment 1010 of the BIBe along with ephemeris information for a part of the satellite list 1012. All subsequent segments (e.g., the subsequent segment 1014) carry a segment number (e.g., the segment number 1016) and information for other parts of the satellite list 1018. For example, the segment number of the first subsequent segment may be "1", the segment number of the second subsequent segment may be "2", and so on. Again, each segment for a given BIBe may contain a sequence number (e.g., the sequence number 1020) associated with the list.

A UT may use the sequence numbers in BIBe segments to re-assemble the BIBe across multiple BI windows. In an example implementation, the BIBe segments that are used to re-assemble the BIBe message may all have the same sequence number across all those BIBe segments.

In this case, if a UT receives a BIBe segment with a sequence number different from the one included in the BIBe segments that the UT has previously received and stored for re-assembly, the UT may discard all the previously received BIBe segments (i.e. those having a sequence number different from the one received in the latest BIBe segment).

Typically, a given BIBe segment will contain ephemeris information for an integer number of satellites. However, information for a particular satellite could extend across a boundary in some implementations. A UT may decode and use the information contained in individual BIBe segments even before all the BIBe segments have been received and the complete BIBe has been re-assembled. However, BIBe reading might only be deemed complete when the UT receives all segments of the BIBe.

Completion of BIBe reading marks (e.g., indicates) the start of a refresh period. The refresh period indicates the time duration within which the UT performs another reading of the BIBe. If the value of the refresh period is set to 0, the UT may keep attempting to read the BIBe.

Number of Satellites Listed in BIBe

The BIBe may include information about all of the satellites that any UT under the corresponding beam's footprint may "see" within the next "refresh period" duration. Therefore, the number of satellites included in BIBe may be a function of the refresh period. In addition, the number of satellites indicated in BIBe (and BIB4) may be a function of the local latitude and whether the broadcasting beam is located on a seam as discussed below.

Example Operation Near a Polar Region

The orbital paths taken by different satellites are closer to one another near the Earth's poles. As a result, the number of satellites within a given area will be greater near the poles than at other latitudes. Consequently, more neighbor cell list information and ephemeris information may need to be transmitted in this case. Hence, segmentation may be called for in the event a device is located near one of the poles.

Example Operation Near a Seam

A seam is a location where the motions of the satellites in two neighboring planes are in the opposite directions (e.g., where North-bound and South-bound satellites are next to each other). In some cases, there may be two seams in a satellite system.

Since some of the neighboring satellites will be moving in the opposite direction at a seam, the list of neighbor satellites will change more quickly as compared to a scenario where the satellite are moving in the same direction. As a result, within a given period of time, the number of neighbor satellites will be greater for satellites near a seam than for satellites that are not near a seam. Consequently, more neighbor cell list information and ephemeris information may need to be transmitted in this case. Hence, segmentation may be called for in the event a device is located at a seam.

Example Request

A UT may send a request message to request information (e.g., ephemeris information) in a unicast manner. The request could be for the information for the full satellite constellation or only a part of the constellation (e.g., consisting of those satellites that will be seen in the next few minutes).

A "request type" bit in the message may indicate the type of request. A request for the information for the full constellation may guarantee that the same will be provided by the network. A request for a partial constellation can be made when BIBe reading could not be completed within the refresh period.

Example Response

A response message contains the information (e.g., ephemeris information) requested by a request message. The format of the information may be similar as that included in the BIBe.

The network may send this response message on its own (e.g., without receiving a corresponding request message from the UT) in some scenarios. In this case, the network may omit a Radio Transaction Identifier in this message.

The response may contain the ephemeris information for the full constellation or only a part of it, as requested by the UT. As with BIBs, the number of satellites included in this message may be a function of the included refresh period as well as the local latitude.

A response message (e.g., an Info Response message) structure may also support segmentation of ephemeris information into multiple self-decodable segments. The list may contain satellite ephemeris information for a complete or a partial constellation, and this may be indicated by a bit in the message.

The list may be divided into a number of segments depending on available radio resources. The total number of segments (e.g., the segment count) and the refresh period may be provided in the first segment of the Info Response message along with ephemeris information for a part of the satellite list. All subsequent segments may carry a segment number and ephemeris information for other parts of the satellite list.

A response (e.g., an Info Response) segment may contain ephemeris information for an integer number of satellites. A UT may decode and use satellite ephemeris information contained in an individual segment even before all the Info Response segments have been received and the complete Info Response has been re-assembled. However, the Info Response reading might be deemed complete only when the UT receives all segments of the Info Response message. Completion of an Info Response reading may mark the start of a refresh period.

Example Parameters

The length of the Satellite List (in the BIBe) may be 1 . . . 256 in an example implementation.

One proposed value for the initial system setup is 12 (e.g., corresponding to 6 minutes near equator). At the maximum capacity of 256 satellites a "refresh period" of about 250 minutes can be attained near the equator (approximately 25 minutes near 60° latitude).

The length of the Satellite List in the unicast message "Radio Ephemeris Information Response" may be 1 . . . 4096 in an example implementation.

The range of Refresh Time (in the BIBe) may be {30*(0 . . . 255) seconds)} in an example implementation.

The proposed value for the initial setup may be 12 (e.g., 360 seconds or 6 minutes) in an example implementation. It may be assumed that it is neither necessary nor desirable to broadcast the ephemeris information for larger refresh time values.

The range for the BIBe Refresh Time in the unicast message "Radio Ephemeris Information Response" may also be the same in an example implementation.

The range of the Segment Count (in the BIBe) may be 1 . . . 32 in an example implementation. Segment Count may be a function of the number of satellites in the list and radio resources available for BIBe transmission in an example implementation.

For an initial setup of 12 satellites (e.g., 360 seconds or 6 minutes), the ephemeris information list may use approximately 350 resource blocks (RBs) in an example implementation.

In a normal mode of operation, the maximum BIB size may be 8,760 bits (approximately 650 resource blocks, RBs) in an example implementation. Hence, if the number of available RBs is less than 650, BIBe may just use one segment.

In a power save mode, the maximum available resource blocks may be approximately 54 in an example implementation. Hence, BIBe may use 12 segments at normal latitudes in this example implementation.

The range for the Segment Count in the unicast message "Radio Ephemeris Information Response" may also be the same (in an example implementation).

The range of Sequence Numbers (in the BIBe) may be 0 . . . 3 in an example implementation. The Sequence Number may be changed whenever the network modifies the ephemeris information list. Worst case BIBe contents may be expected to change a maximum once during a BIBe refresh cycle. The Sequence Number may be over-provisioned to allow for any unanticipated scenarios.

Example Reception Operation

When the UT receives the ephemeris information in the BIBe or in the Radio Ephemeris Information Response message, the UT starts a timer with duration equal to the indicated refresh period and the next BIBe reading may need to be completed before the timer expiry.

If the value of the refresh period is set to 0, the UT may keep attempting to read the BIBe at the next frames/subframes scheduled to carry BIBe, as indicated by the BIB1.

If it becomes known to the UT that the BIBe reading cannot be completed within the refresh period, the UT may request the network for unicast transfer of the ephemeris information by sending a "Radio Ephemeris Info Request" message.

The UT can request the network for the ephemeris information in the "Radio Ephemeris Info Request" message, when needed. This could be needed due to, for example, half-duplex operation of connected mode UTs or any other unforeseen reason.

A freshly powered-on UT may request the network for the transfer of ephemeris information for the full constellation. The NAC can, on its own, unicast the ephemeris information in the "Radio Ephemeris Information Response" message, when needed. This could become necessary due to any unforeseen reason and this is basically a backup mechanism.

Example Storage Operation

The UT may maintain a database of ephemeris information for all satellites, indexed by their satellite identities.

When the UT receives the ephemeris information for a satellite, the UT may take the following actions. If an entry is not present for that satellite in the database, the UT may create an entry in its database and store the received information for that satellite there. If the ephemeris information for that satellite is already stored in the database, the UT may overwrite that existing information with the received information. The UT may keep the ephemeris information for a satellite stored in its database for a period of time (e.g., a minimum of 14 days) unless it is overwritten with freshly received ephemeris information for that satellite.

Scheduling Changes

BIB4 may be covered by a version control mechanism of the BIB1 Value Tag. Once a UT has read BIB4 in a cell, the UT may skip reading BIB4 again in the same cell if there is no change in BIB1 value tag. BIBe might not be covered by the version control mechanism. A UT may read BIBe completely at least once during the refresh period.

BIB4 is valid within the scope of a cell. On cell reselection, a previously read BIB4 becomes invalid. Thus, the UT reads BIB4 again in the new cell. BIBe is valid across cells. A UT is may read BIBe completely at least once during the refresh period. The UT also may keep the BIBe contents stored for a period of time (e.g., at least 14 days).

BIB4 (e.g., including a neighbor cell information list) may be transmitted periodically (e.g., every 2.56 seconds) to ensure that a UT can attempt 2-3 readings. This may correspond to a dwell time of, for example, 7-8 seconds. Thus, in this example, the UT will get a minimum of 2 and a maximum of 4 read attempts in a cell. In an example implementation, neighbor cell information can be transmitted in a maximum of 32 segments of BIB4. A larger number of segments might only be used in a power save mode. BIB4 may use a bigger BI window in power save mode. A new BIB4-specific BI window may be defined in BIB1 which can be of size 5/10/15/20/40 ms, etc., to accommodate the maximum number of BIB4 segments. BIB4 may be sent in a separate BI message. BIB4 may be transmitted in the penultimate BI window.

In an example implementation, BIBe (e.g., including Ephemeris Information) can be transmitted every 5.12 seconds. A UT may get 1 attempt or 2 attempts to read BIBe in a beam/cell in such a scenario. The validity of BIBe may be a function of the number of satellites that have information contained in the BIBe. A standard configuration of 12 satellites gives a validity time of 6 minutes on the equator in this example. A UT is not required to read BIBe on the cell/beam change within its refresh period. The ephemeris information list can be transmitted in, for example, a maximum of 32 segments of BIBe. A larger number of segments may be used in the satellite power save mode or other scenarios that use segmentation. In addition, BIBe may use a bigger BI window in power save mode or other scenarios that use segmentation. A new BIBe-specific BI window may be defined in BIB1 which can be of size 5/10/15/20/40 ms to accommodate the maximum number of BIBe segments. BIBe may be sent in a separate BI message. BIBe may be transmitted in the last BI window.

When acquiring a BI message, the UE may determine the start of the BI window for the BI message and receive information (e.g., DL-SCH) using a subscriber identifier (e.g., BI-RNTI) from the start of the BI window and continue until the end of the BI window.

To determine the start of the BI window for an BI message, the following three operations may be performed.

The first operation involves, for all BI messages except the last (i.e., the one carrying Broadcast Information Block Type E), determining the number n which corresponds to the order of entry in the list of BI messages configured by the Scheduling Info List in the Broadcast Information Block Type 1. This operation also involves determining the integer value $x=(n-1)*w$, where w is the BI window length.

The second operation involves, for the last BI message (i.e., the one carrying Broadcast Information Block Type E), determining the number n which corresponds to the order of entry in the list of BI messages configured by the Scheduling Info List in a Broadcast Information Block Type 1. This operation also involves determining the integer value $x=(n-2)*w+w-BIB4$, where w is the BI window length and w–BIB4 is the BIB4–BI window length.

For the third operation, the BI window starts at the subframe # a, where a=x mod 10, in the radio frame for which the subframe number (SFN) mod T=FLOOR(x/10), and where T is the BI-Periodicity of the concerned BI message. The network may configure a BI window of 1 ms if all BIs are scheduled before subframe #5 in radio frames for which SFN mod 2=0.

Reception of the DL-SCH using the BI-RNTI may occur from the start of the BI window and continue until the end of the BI window, or until the BI message was received, excluding the subframe #5 in radio frames for which SFN mod 2=0. The absolute length in time of the BI window may be given by a BI window length parameter.

Figure 11:
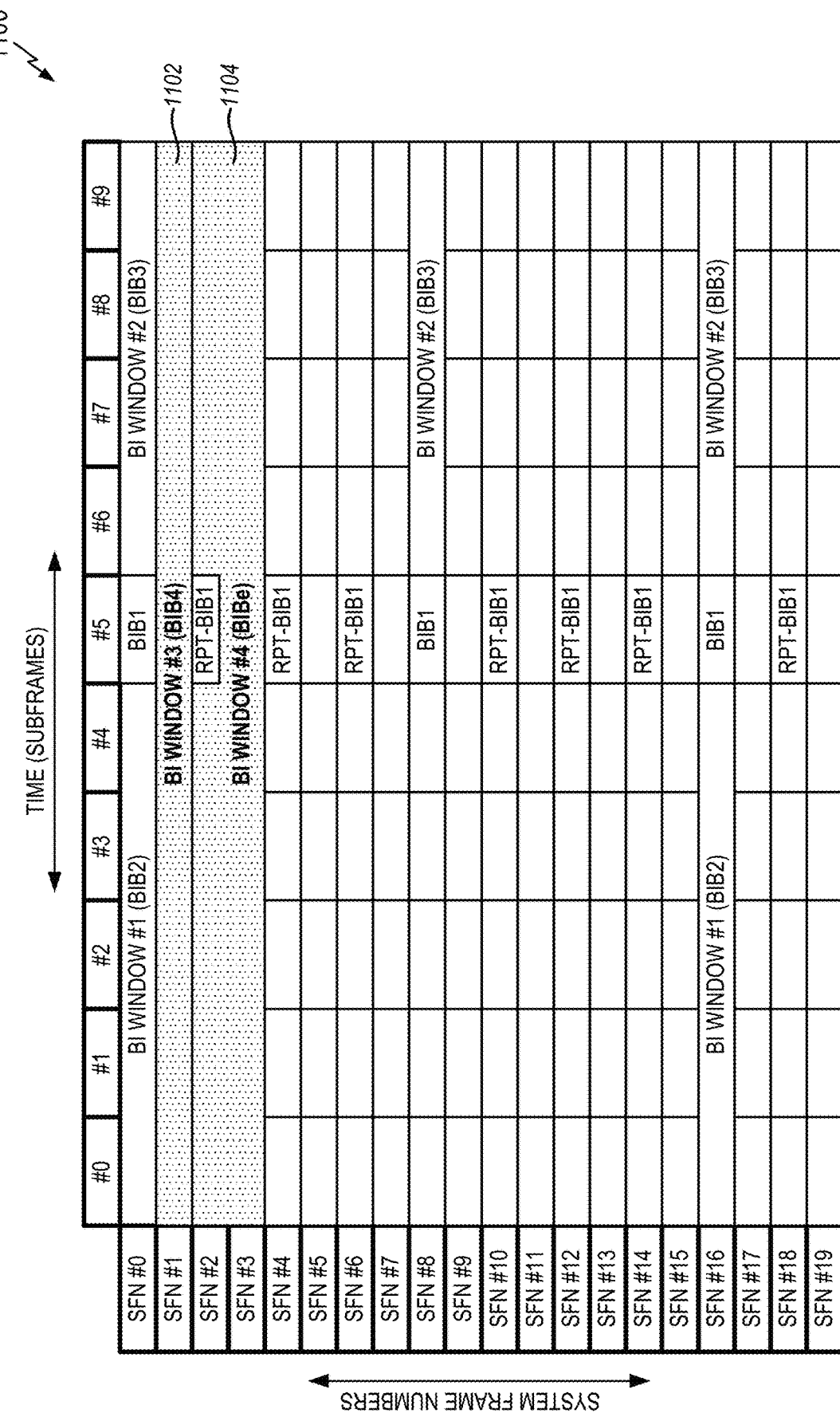
FIG. 11 is a diagram illustrating example scheduling over sub-frames in accordance with some aspects of the disclosure.

FIG. 11 is an example BIB schedule with a BIB4 window 1102 and a BIBe window 1104 (e.g., default BI window size=5 ms). In this example, BIB2 has a periodicity of 160 ms, BIB3 has a periodicity of 80 ms, BIB4 has a periodicity of 2560 ms, and BIBe has a periodicity of 5120 ms. The BI window for BIB4 has a size=10 ms and the BI window for BIBe has a size=20 ms in this example.

Example Communication Network

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc.

Thus, in addition to satellite communication, the teachings herein can be implemented according to various network technologies including, without limitation, 5G technology, fourth generation (4G) technology, third generation (3G) technology, and other network architectures. Similarly, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link. The actual telecommunication standard, network architecture, and/or communication standard used will depend on the specific application and the overall design constraints imposed on the system.

For purposes of illustration, the following describes certain aspects of the teachings herein in the context of a 5G system. It should be appreciated, however, that the teachings herein may be used in other systems as well. Thus, references to functionality in the context of 5G terminology should be understood to be equally applicable to other types of technology, networks, components, signaling, and so on.

Figure 12:
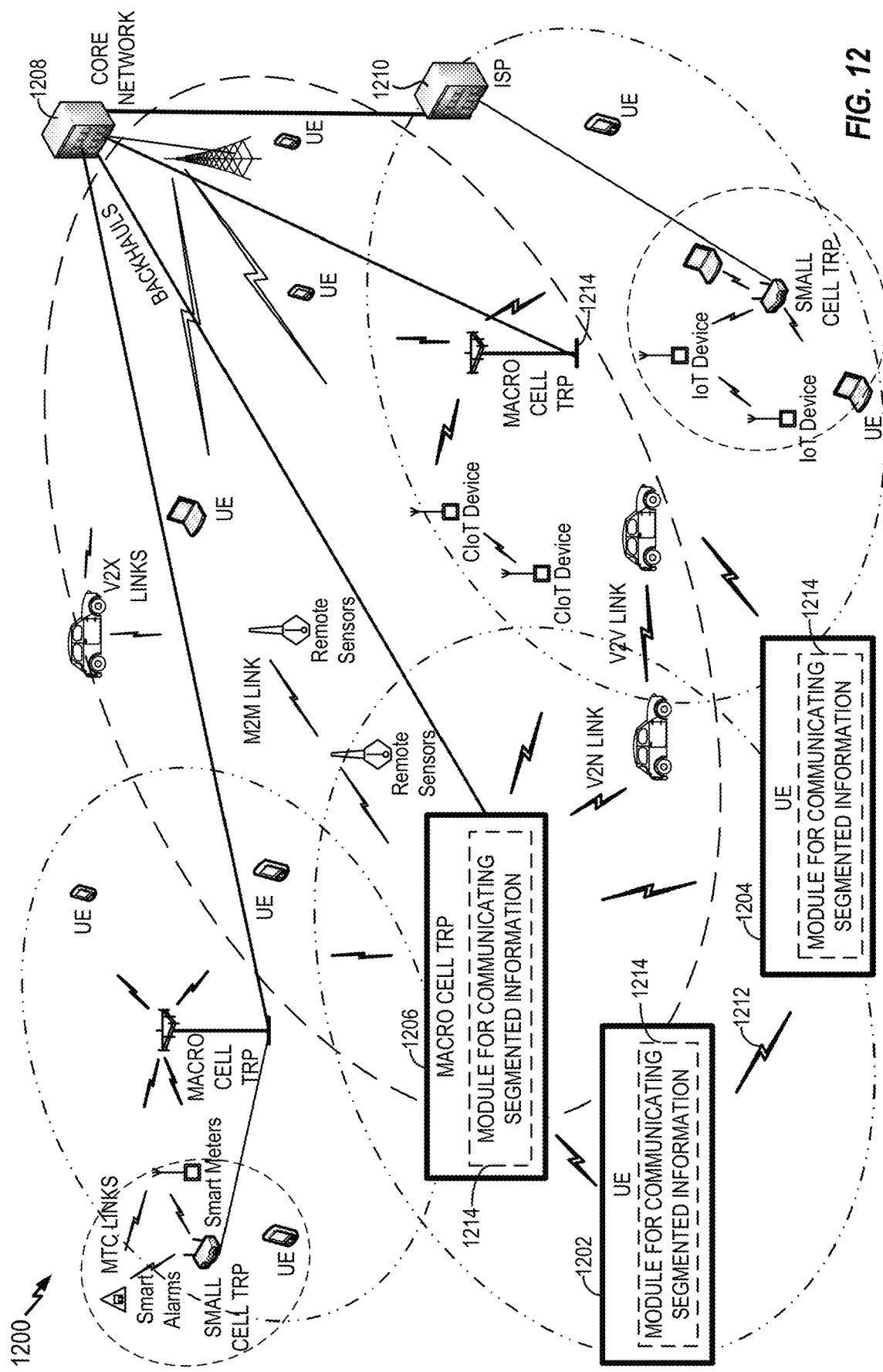
FIG. 12 is a block diagram of an example communication system within which aspects of the disclosure may be implemented.

FIG. 12 illustrates an example of a wireless communication system 1200 where a user equipment (UE) can communicate with other devices via wireless communication signaling. For example, a first UE 1202 and a second UE 1204 may communicate with a transmit receive point (TRP) 1206 using wireless communication resources managed by the TRP 1206 and/or other network components (e.g., a core network 1208, an internet service provider (ISP) 1210, peer devices, and so on). In some implementations, one or more of the components of the system 1200 may communicate with each other directedly via a device-to-device (D2D) link 1212 or some other similar type of direct link.

It should be appreciated that the system 1200 would typically include other devices as well (e.g., one or more of: other TRPs, other UEs, other wireless communication nodes, or other network entities). In some aspect, one or more of these devices may correspond to, for example, the first apparatus 602 of FIG. 6. In some aspect, one or more of these devices may correspond to, for example, the second apparatus 604 of FIG. 6.

In some scenarios, communication of information between two or more of the components of the system 1200 may involve segmentation as taught herein. For example, the UE 1202 may send segmented information the TRP 1206 via a first link. As another example, the TRP 1206 may send segmented information the UE 1202 via a second link. As yet another example, the UE 1202 may send segmented information the UE 1204 via a third link. Thus, in accordance with the teachings herein, one or more of the UE 1202, the UE 1204, the TRP 1206, or some other component of the system 1200 may include a module for communicating segmented information 1214.

The components and links of the wireless communication system 1200 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 1200. For example, D2D links may include, without limitation, machine-to-machine (M2M) links, MTC links, vehicle-to-vehicle (V2V) links, and vehicle-to-anything (V2X) links Network-to-device links may include, without limitation, uplinks (or reverse links), downlinks (or forward links), and vehicle-to-network (V2N) links.

Example Transmitter Process

Figure 13:
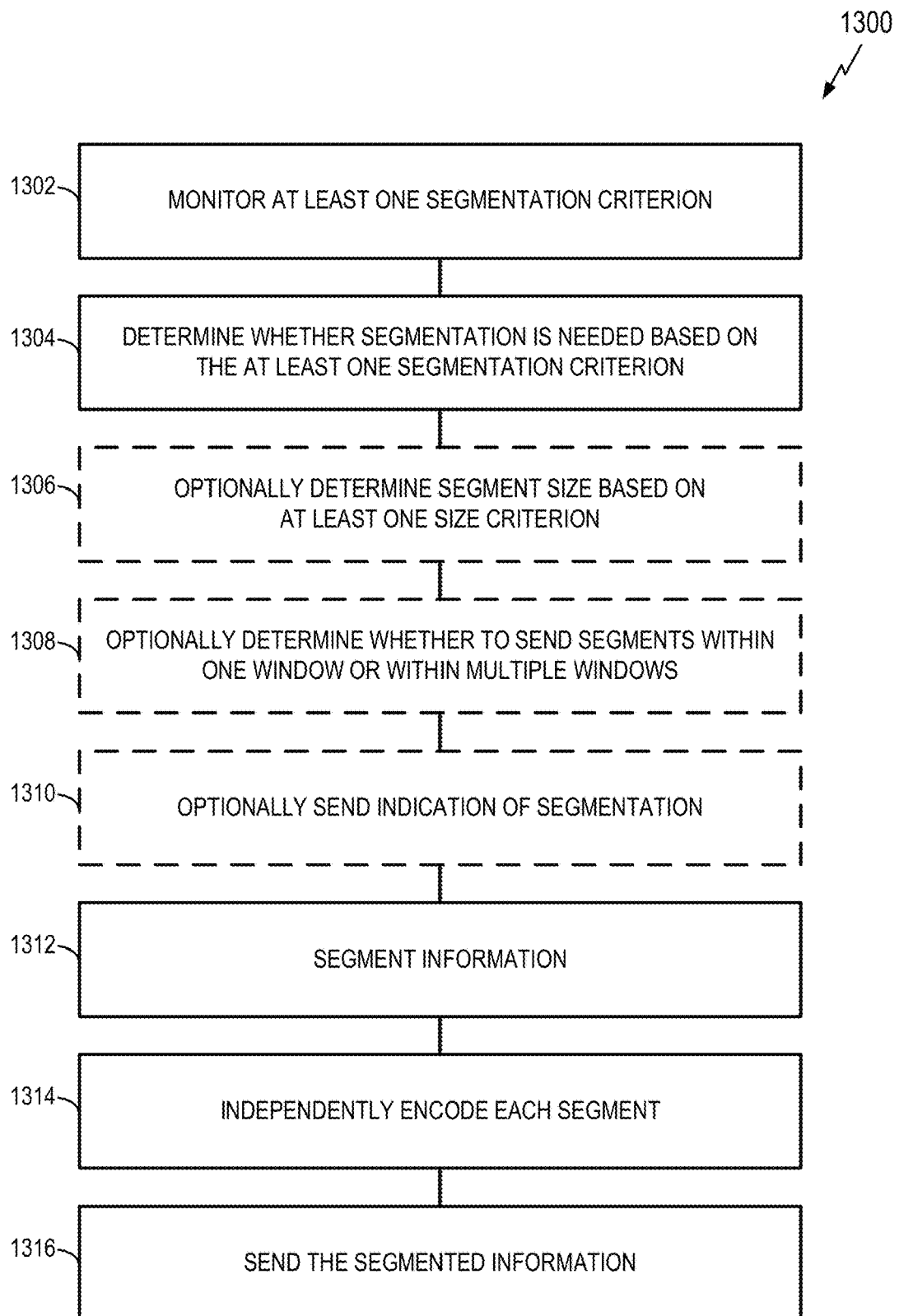
FIG. 13 is a flowchart illustrating an example segmentation process for a transmitter in accordance with some aspects of the disclosure.

FIG. 13 illustrates a process 1300 for communication in accordance with some aspects of the disclosure. The process 1300 may take place within a processing circuit (e.g., the processing circuit 1510 of FIG. 15 or the processing circuit 1710 of FIG. 17), which may be located in a GN, a base station (BS), a UT, a user equipment (UE), a transmit receive point (TRP), a satellite network portal (SNP), or some other suitable apparatus. Of course, in various aspects within the scope of the disclosure, the process 1300 may be implemented by any suitable apparatus capable of supporting communication-related operations.

At block 1302, an apparatus (e.g., a GN) monitors at least one segmentation criterion. For example, a GN may monitor the power mode (e.g., power state) of a satellite or other device. As another example, a GN may monitor the location (e.g., position) of a satellite or other device. As yet another example, a GN may monitor at least one criterion associated with broadcast data (e.g., the broadcasting of data). As a further example, a GN may determine the window size allocated for communication of a data block.

At block 1304, the apparatus determines whether segmentation of a block of data is need. In an example implementation, a decision as to whether an information block needs to be segmented may be based on the size of the information block. For example, an information block that is larger than an allotted window size (e.g., a packet boundary) may be segmented.

In some aspects, this determination may be based on the at least one segmentation criterion of block 1302. For example, segmentation may be called for in the communication of a data block via a satellite if the satellite is or will be operating in a lower power mode. As another example, segmentation may be called for in the communication of a data block via a satellite if the satellite is or will be operating near the Earth's poles or near a "seam." As yet another example, segmentation may be called for in the communication of a data block depending on the size of the allocated window (e.g., a smaller window may trigger the use of segmentation).

At optional block 1306, the apparatus may determine the size of the segments to be used. In some aspects, this determination may be dynamically based on one or more criterion from block 1302. For example, lower protocol layers might allocate different transmission window sizes under different circumstances (e.g., depending on the power mode). Thus, if a smaller window is allocated (e.g., for power-save mode), the information block may be segmented into smaller segments.

At optional block 1308, the apparatus may determine whether to send segments within one window or within multiple windows. For example, all of the segments could be transmitted within one window in some cases or within multiple windows in other cases. Thus, the manner in which the segments are transmitted could be dynamically selected based on at least one criterion (e.g., from block 1302).

At optional block 1310, the apparatus may send an indication of the segmentation. For example, a GN may transmit a message to a UT via a satellite, where the message indicates one or more parameters of the segmentation (e.g., segment size, whether segments are independently encoded, etc.).

In some cases, to facilitate the segmentation, information about the segmentation may be included in the information sent from the transmitter to the receiver. For example, a first segment may indicate the number of segments and subsequent segments may indicate the segment number.

At block 1312, the apparatus segments information to be transmitted. This segmentation is in accordance with the designated segment size (e.g., as determined at block 1306).

Various types of information can be segmented. For example, a GN could segment ephemeris data, neighbor list information, or some other type of information before sending the information to a UT.

At block 1314, the apparatus may independently encode each segment (e.g., over packet boundaries). In this case, at the receiver, each segment can be independently decodable.

At block 1316, the apparatus sends the segmented information including the encoded segments. For example, a GN may transmit the segments to a UT via a satellite.

In some aspects, an apparatus may perform any of the operation discussed above for FIG. 13, or any combination thereof.

Example Receiver Process

Figure 14:
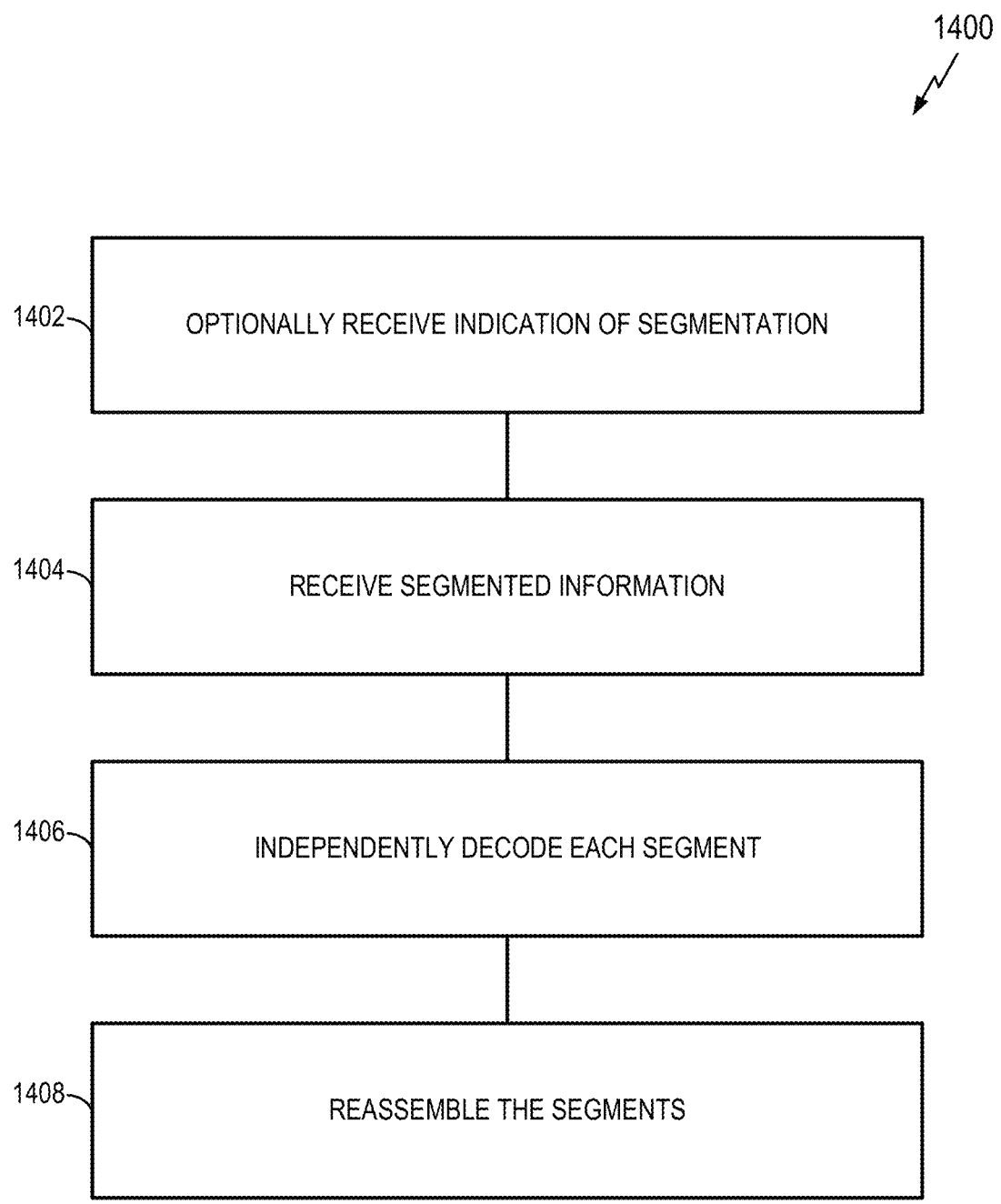
FIG. 14 is a flowchart illustrating an example segmentation process for a receiver in accordance with some aspects of the disclosure.

FIG. 14 illustrates a process 1400 for communication in accordance with some aspects of the disclosure. The process 1400 may take place within a processing circuit (e.g., the processing circuit 1510 of FIG. 15), which may be located in a UT, a UE, a GN, a base station (BS), a user equipment (UE), a transmit receive point (TRP), a satellite network portal (SNP), or some other suitable apparatus. Of course, in various aspects within the scope of the disclosure, the process 1400 may be implemented by any suitable apparatus capable of supporting communication-related operations.

At optional block 1402, an apparatus (e.g., a UT) may receive an indication of segmentation. For example, a UT may receive the information sent at block 1310 of FIG. 13.

At block 1404, the apparatus receives segmented information. For example, a UT may receive the segments sent at block 1316 of FIG. 13.

At block 1406, the apparatus independently decodes each segment.

At block 1408, the apparatus reassembles the segments. The apparatus may then use the recovered information block.

In some aspects, an apparatus may perform any of the operation discussed above for FIG. 14, or any combination thereof.

First Example Apparatus

Figure 15:
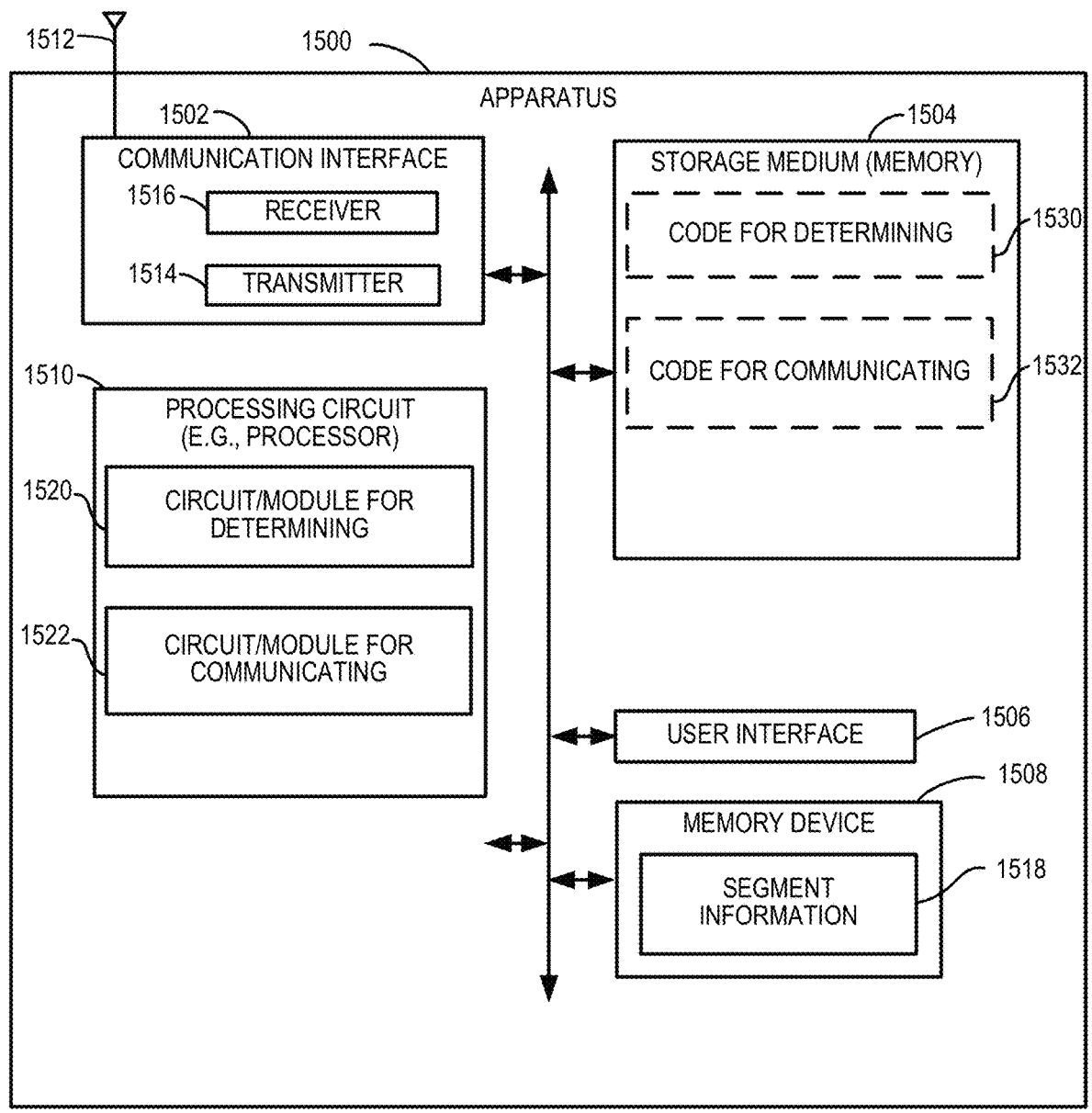
FIG. 15 is a block diagram illustrating an example hardware implementation for an apparatus (e.g., an electronic device) that can support segmentation in accordance with some aspects of the disclosure.

FIG. 15 illustrates a block diagram of an example hardware implementation of an apparatus 1500 configured to communicate according to one or more aspects of the disclosure. The apparatus 1500 could embody or be implemented within a GN, a UT, a base station (BS), a user equipment (UE), a transmit receive point (TRP), a satellite network portal (SNP), or some other type of device that supports wireless communication. In various implementations, the apparatus 1500 could embody or be implemented within a server, a network entity, a computer, or any other electronic device having circuitry. In various implementations, the apparatus 1500 could be a stationary component or a mobile component.

The apparatus 1500 includes a communication interface 1502 (e.g., at least one transceiver), a storage medium 1504, a user interface 1506, a memory device (e.g., a memory circuit) 1508, and a processing circuit 1510 (e.g., at least one processor). In various implementations, the user interface 1506 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit 1510 and the overall design constraints. The signaling bus links together various circuits such that each of the communication interface 1502, the storage medium 1504, the user interface 1506, and the memory device 1508 are coupled to and/or in electrical communication with the processing circuit 1510. The signaling bus may also link various other circuits (not shown) such as timing sources, peripherals, voltage regulators, and power management circuits, which are well known in the art, and therefore, will not be described any further.

The communication interface 1502 provides a means for communicating with other apparatuses over a transmission medium. In some implementations, the communication interface 1502 may be adapted to facilitate wireless communication of the apparatus 1500. For example, the communication interface 1502 may include circuitry and/or programming adapted to facilitate the communication of information bi-directionally with respect to one or more communication devices in a network. Thus, in some implementations, the communication interface 1502 may be coupled to one or more antennas 1512 for wireless communication within a wireless communication system. In some implementations, the communication interface 1502 may be configured for wire-based communication. For example, the communication interface 1502 could be a bus interface, a send/receive interface, or some other type of signal interface including drivers, buffers, or other circuitry for outputting and/or obtaining signals (e.g., outputting signal from and/or receiving signals into an integrated circuit). The communication interface 1502 can be configured with one or more standalone receivers and/or transmitters, as well as one or more transceivers. In the illustrated example, the communication interface 1502 includes a transmitter 1514 and a receiver 1516. The communication interface 1502 serves as one example of a means for receiving and/or means transmitting.

The memory device 1508 may represent one or more memory devices. As indicated, the memory device 1508 may maintain segment information 1518 along with other information used by the apparatus 1500. In some implementations, the memory device 1508 and the storage medium 1504 are implemented as a common memory component.

The memory device 1508 may also be used for storing data that is manipulated by the processing circuit 1510 or some other component of the apparatus 1500.

The storage medium 1504 may represent one or more computer-readable, machine-readable, and/or processor-readable devices for storing programming, such as processor executable code or instructions (e.g., software, firmware), electronic data, databases, or other digital information. The storage medium 1504 may also be used for storing data that is manipulated by the processing circuit 1510 when executing programming. The storage medium 1504 may be any available media that can be accessed by a general purpose or special purpose processor, including portable or fixed storage devices, optical storage devices, and various other mediums capable of storing, containing or carrying programming.

By way of example and not limitation, the storage medium 1504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1504 may be embodied in an article of manufacture (e.g., a computer program product). By way of example, a computer program product may include a computer-readable medium in packaging materials. In view of the above, in some implementations, the storage medium 1504 may be a non-transitory (e.g., tangible) storage medium.

The storage medium 1504 may be coupled to the processing circuit 1510 such that the processing circuit 1510 can read information from, and write information to, the storage medium 1504. That is, the storage medium 1504 can be coupled to the processing circuit 1510 so that the storage medium 1504 is at least accessible by the processing circuit 1510, including examples where at least one storage medium is integral to the processing circuit 1510 and/or examples where at least one storage medium is separate from the processing circuit 1510 (e.g., resident in the apparatus 1500, external to the apparatus 1500, distributed across multiple entities, etc.).

Programming stored by the storage medium 1504, when executed by the processing circuit 1510, causes the processing circuit 1510 to perform one or more of the various functions and/or process operations described herein. For example, the storage medium 1504 may include operations configured for regulating operations at one or more hardware blocks of the processing circuit 1510, as well as to utilize the communication interface 1502 for wireless communication utilizing their respective communication protocols. In some aspects, the storage medium 1504 may include computer-readable medium storing computer-executable code, including code to perform the functionality described herein.

The processing circuit 1510 is generally adapted for processing, including the execution of such programming stored on the storage medium 1504. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1510 is arranged to obtain, process and/or send data, control data access and storage, issue commands, and control other desired operations. The processing circuit 1510 may include circuitry configured to implement desired programming provided by appropriate media in at least one example. For example, the processing circuit 1510 may be implemented as one or more processors, one or more controllers, and/or other structure configured to execute executable programming. Examples of the processing circuit 1510 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1510 are for illustration and other suitable configurations within the scope of the disclosure are also contemplated.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 1-13 and 16. As used herein, the term "adapted" in relation to the processing circuit 1510 may refer to the processing circuit 1510 being one or more of configured, used, implemented, and/or programmed to perform a particular process, function, operation and/or routine according to various features described herein.

The processing circuit 1510 may be a specialized processor, such as an application-specific integrated circuit (ASIC) that serves as a means for (e.g., structure for) carrying out any one of the operations described in conjunction with FIGS. 1-13 and 16. The processing circuit 1510 serves as one example of a means for transmitting and/or a means for receiving. In some implementations, the processing circuit 1710 may provide and/or incorporate, at least in part, the functionality described above for the segment controller 236 of FIG. 2 or the control processor 420 of FIG. 4.

According to at least one example of the apparatus 1500, the processing circuit 1510 may include one or more of a circuit/module for determining 1520 or a circuit/module for communicating 1522. In various implementations, the circuit/module for determining 1520 or the circuit/module for communicating 1522 may provide and/or incorporate, at least in part, the functionality described above for the segment controller 236 of FIG. 2 or the control processor 420 of FIG. 4.

As mentioned above, programming stored by the storage medium 1504, when executed by the processing circuit 1510, causes the processing circuit 1510 to perform one or more of the various functions and/or process operations described herein. For example, the programming may cause the processing circuit 1510 to perform the various functions, steps, and/or processes described herein with respect to FIGS. 1-13 and 16 in various implementations. As shown in FIG. 15, the storage medium 1504 may include one or more of code for determining 1530 or code for communicating 1532. In various implementations, the code for determining 1530 or the code for communicating 1532 may be executed or otherwise used to provide the functionality described herein for the circuit/module for determining 1520 or the circuit/module for communicating 1522.

The circuit/module for determining 1520 may include circuitry and/or programming (e.g., code for determining 1530 stored on the storage medium 1504) adapted to perform several functions relating to, for example, determining segmentation for a broadcast information block. In some aspects, the circuit/module for determining 1520 (e.g., a means for determining) may correspond to, for example, a processing circuit.

Initially, the circuit/module for determining 1520 may obtain information upon which the determination is to be based. For example, the circuit/module for determining 1520 may obtain information as discussed above in conjunction with FIGS. 6-13 (e.g., from the communication interface 1502, the memory device 1508, or some other component of the apparatus 1500). The circuit/module for determining 1520 may then make the determination based on the obtained information. For example, the circuit/module for determining 1520 may segment information as discussed above in conjunction with FIGS. 6-13. The circuit/module for determining 1520 may then output the resulting segmented information (e.g., to the circuit/module for communicating 1522, the memory device 1508, or some other component).

The circuit/module for communicating 1522 may include circuitry and/or programming (e.g., code for communicating 1532 stored on the storage medium 1504) adapted to perform several functions relating to, for example, communicating information. In some implementations, the communication involves receiving the information. In some implementations, the communication involves sending (e.g., transmitting) the information.

In some implementations where the communicating involves sending information, the circuit/module for communicating 1522 obtains information (e.g., from the circuit/module for determining 1520, the memory device 1508 or some other component of the apparatus 1500), processes (e.g., encodes for transmission) the information, and outputs the processed information. In some scenarios, the communicating involves sending the information to another component of the apparatus 1500 (e.g., the transmitter 1514, the communication interface 1502, or some other component) that will transmit the information to another device. In some scenarios (e.g., if the circuit/module for communicating 1522 includes a transmitter), the communicating involves the circuit/module for communicating 1522 transmitting the information directly to another device (e.g., the ultimate destination) via radio frequency signaling or some other type of signaling suitable for the applicable communication medium.

In some implementations where the communicating involves receiving information, the circuit/module for communicating 1522 receives information (e.g., from the communication interface 1502, the receiver 1516, the memory device 1508, some other component of the apparatus 1500, or some other device), processes (e.g., decodes) the information, and outputs the information to another component of the apparatus 1500 (e.g., the memory device 1508, or some other component). In some scenarios (e.g., if the circuit/module for communicating 1522 includes a receiver), the communicating involves the circuit/module for communicating 1522 receiving information directly from a device that transmitted the information (e.g., via radio frequency signaling or some other type of signaling suitable for the applicable communication medium).

The circuit/module for communicating 1522 (e.g., a means for communicating) may take various forms. In some aspects, the circuit/module for communicating 1522 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1502 includes the circuit/module for communicating 1522 and/or the code for communicating 1532. In some implementations, the circuit/module for communicating 1522 and/or the code for communicating 1532 is configured to control the communication interface 1502 (e.g., a transceiver, a receiver, or a transmitter) to communicate the information.

First Example Process

Figure 16:
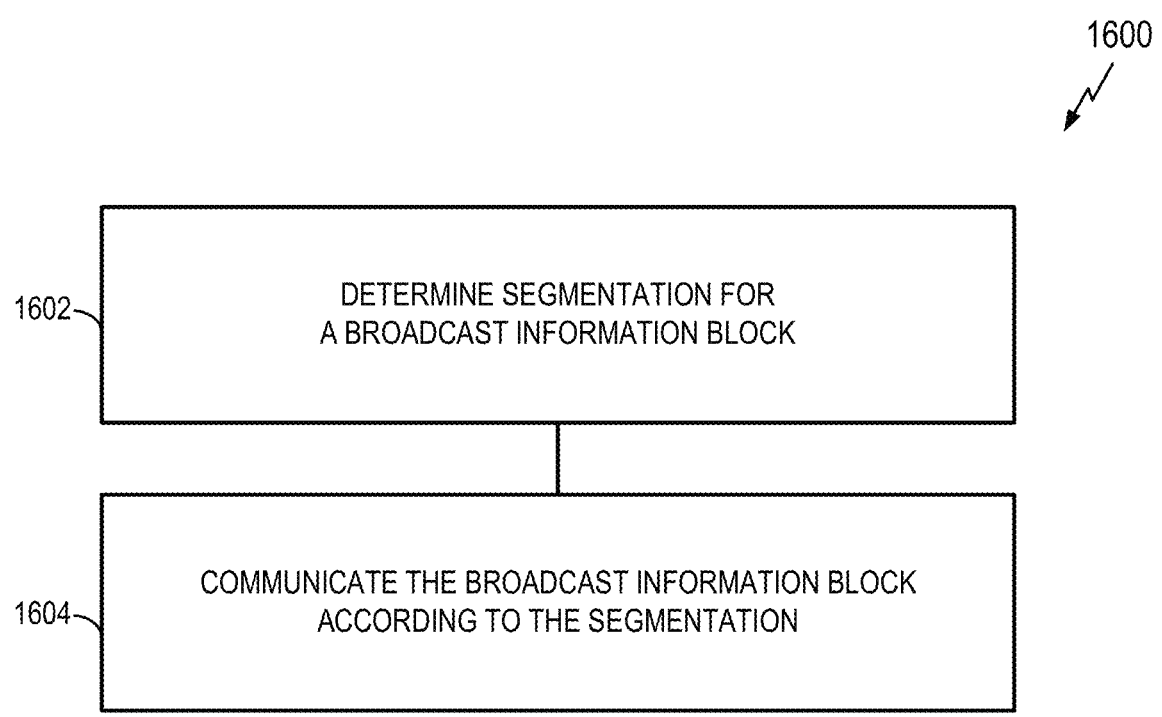
FIG. 16 is a flowchart illustrating an example segmentation process in accordance with some aspects of the disclosure.

FIG. 16 illustrates a process 1600 for communication in accordance with some aspects of the disclosure. The process 1600 may take place within a processing circuit (e.g., the processing circuit 1510 of FIG. 15), which may be located in a GN, a base station (BS), a UT, a user equipment (UE), a transmit receive point (TRP), a satellite network portal (SNP), or some other suitable apparatus. In some implementations, the process 1600 may be performed by an GN for at least one non-geosynchronous satellite. Of course, in various aspects within the scope of the disclosure, the process 1600 may be implemented by any suitable apparatus capable of supporting communication-related operations.

At block 1602, an apparatus determines segmentation for a broadcast information block. The segmentation may take different forms in different scenarios. In some aspects, the segmentation may be across broadcast information windows. In some aspects, the segmentation may be across packet boundaries. In some aspects, the segmentation may be across sub-frames.

In some implementations, the circuit/module for determining 1520 of FIG. 15 performs the operations of block 1602. In some implementations, the code for determining 1530 of FIG. 15 is executed to perform the operations of block 1602.

At block 1604, the apparatus communicates (e.g., sends or receives) the broadcast information block according to the segmentation.

The communicated information may take different forms in different scenarios. In some aspects, the communicated information may include an indication of a quantity of segments being communicated. In some aspects, the communicated information may include an indication of a segment number. In some aspects, the communicated information may include an identifier set with all segments for the broadcast information block.

The communication may take different forms in different scenarios. In some aspects, of the broadcast information block may include transmitting the broadcast information block as a plurality of segments. In some aspects, of the broadcast information block may include receiving the broadcast information block as a plurality of segments.

In some implementations, the circuit/module for communicating 1522 of FIG. 15 performs the operations of block 1604. In some implementations, the code for communicating 1532 of FIG. 15 is executed to perform the operations of block 1604.

In some aspects, the process 1600 may further include defining a larger broadcast information window for the communication.

In some aspects, an apparatus may perform any of the operations discussed above for FIG. 16, or any combination thereof.

Second Example Apparatus

Figure 17:
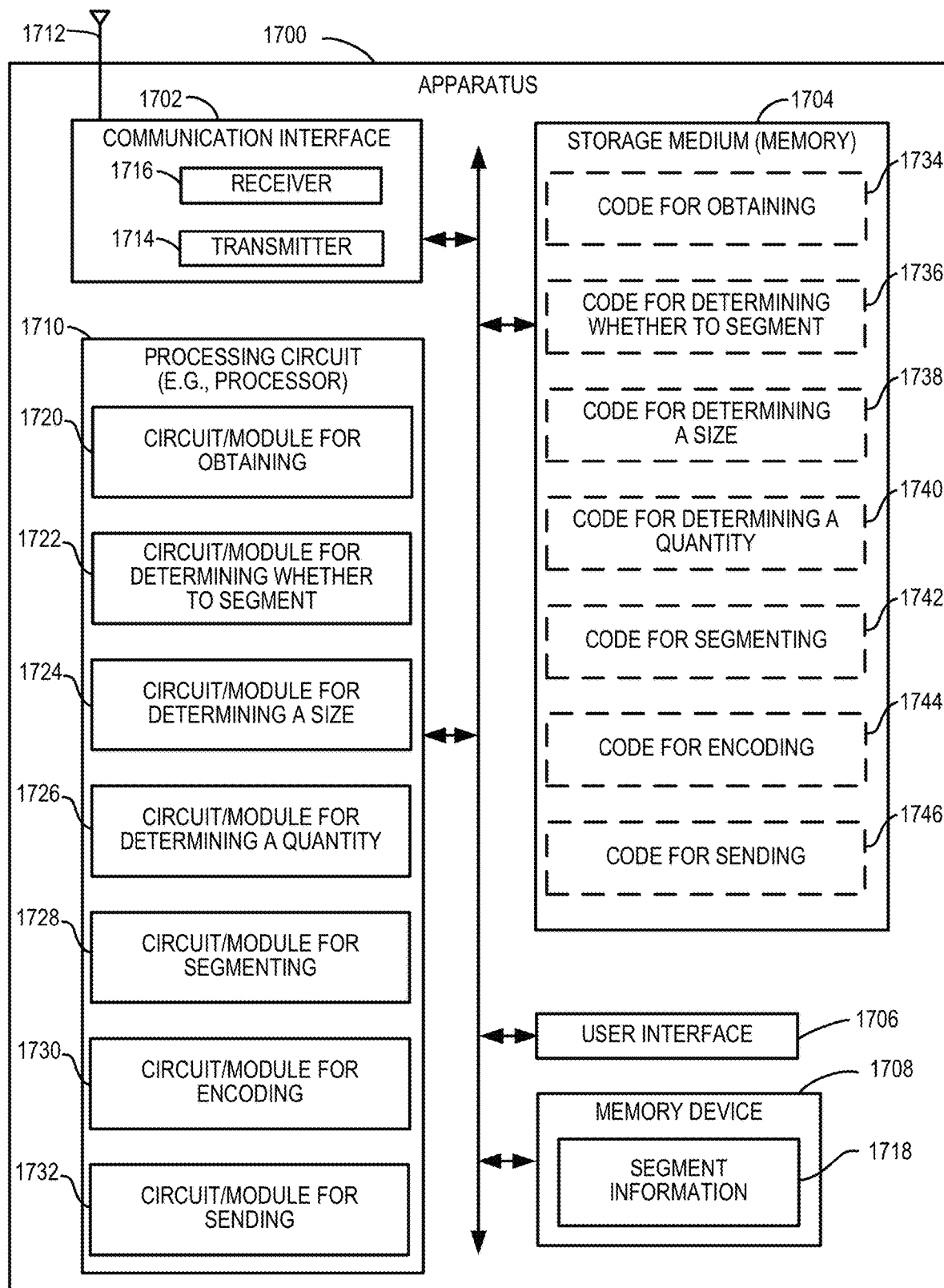
FIG. 17 is a block diagram illustrating an example hardware implementation for an apparatus (e.g., an electronic device) that can support segmentation in accordance with some aspects of the disclosure.

FIG. 17 illustrates a block diagram of an example hardware implementation of another apparatus 1700 configured to communicate according to one or more aspects of the disclosure. The apparatus 1700 could embody or be implemented within a GN, a UT, a base station (BS), a user equipment (UE), a transmit receive point (TRP), a satellite network portal (SNP), or some other type of device that supports wireless communication. In various implementations, the apparatus 1700 could embody or be implemented within a server, a network entity, a computer, or any other electronic device having circuitry. In various implementations, the apparatus 1700 could be a stationary component or a mobile component.

The apparatus 1700 includes a communication interface (e.g., at least one transceiver) 1702, a storage medium 1704, a user interface 1706, a memory device 1708 (e.g., storing segment information 1718), and a processing circuit (e.g., at least one processor) 1710. In various implementations, the user interface 1706 may include one or more of: a keypad, a display, a speaker, a microphone, a touchscreen display, of some other circuitry for receiving an input from or sending an output to a user. The communication interface 1702 may be coupled to one or more antennas 1712, and may include a transmitter 1714 and a receiver 1716. In general, the components of FIG. 17 may be similar to corresponding components of the apparatus 1500 of FIG. 15.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described with respect to FIGS. 1-13 and 18-20. As used herein, the term "adapted" in relation to the processing circuit 1710 may refer to the processing circuit 1710 being one or more of configured, used, implemented, and/or programmed to perform a particular process, function, operation and/or routine according to various features described herein.

The processing circuit 1710 may be a specialized processor, such as an application-specific integrated circuit (ASIC) that serves as a means for (e.g., structure for) carrying out any one of the operations described in conjunction with FIGS. 1-13 and 18-20. The processing circuit 1710 serves as one example of a means for transmitting and/or a means for receiving. In some implementations, the processing circuit 1710 may provide and/or incorporate, at least in part, the functionality described above for the segment controller 236 of FIG. 2 or the control processor 420 of FIG. 4.

According to at least one example of the apparatus 1700, the processing circuit 1710 may include one or more of a circuit/module for obtaining 1720, a circuit/module for determining whether to segment 1722, a circuit/module for determining segment size 1724, a circuit/module for determining window quantity 1726, a circuit/module for segmenting 1728, a circuit/module for encoding 1730, or a circuit/module for sending 1732. In various implementations, the circuit/module for obtaining 1720, the circuit/module for determining whether to segment 1722, the circuit/module for determining a size 1724, the circuit/module for determining a quantity 1726, the circuit/module for segmenting 1728, the circuit/module for encoding 1730, or the circuit/module for sending 1732 may provide and/or incorporate, at least in part, the functionality described above for the segment controller 236 of FIG. 2 or the control processor 420 of FIG. 4.

As mentioned above, programming stored by the storage medium 1704, when executed by the processing circuit 1710, causes the processing circuit 1710 to perform one or more of the various functions and/or process operations described herein. For example, the programming may cause the processing circuit 1710 to perform the various functions, steps, and/or processes described herein with respect to FIGS. 1-13 and 18-20 in various implementations. As shown in FIG. 17, the storage medium 1704 may include one or more of code for obtaining 1734, code for determining whether to segment 1736, code for determining a size 1738, code for determining a quantity 1740, code for segmenting 1742, code for encoding 1744, or code for sending 1746. In various implementations, the code for obtaining 1734, the code for determining whether to segment 1736, the code for determining a size 1738, the code for determining a quantity 1740, the code for segmenting 1742, the code for encoding 1744, or the code for sending 1746 may be executed or otherwise used to provide the functionality described herein for the circuit/module for obtaining 1720, the circuit/module for determining whether to segment 1722, the circuit/module for determining a size 1724, the circuit/module for determining a quantity 1726, the circuit/module for segmenting 1728, the circuit/module for encoding 1730, or the circuit/module for sending 1732.

The circuit/module for obtaining 1720 may include circuitry and/or programming (e.g., code for obtaining 1734 stored on the storage medium 1704) adapted to perform several functions relating to, for example, obtaining information. In some scenarios, the circuit/module for obtaining 1720 may receive information (e.g., from the communication interface 1702, the memory device 1708, or some other component of the apparatus 1700) and process (e.g., decode) the information. In some scenarios (e.g., if the circuit/module for obtaining 1720 is or includes an RF receiver), the circuit/module for obtaining 1720 may receive information directly from a device that transmitted the information. In either case, the circuit/module for obtaining 1720 may output the received information to another component of the apparatus 1700 (e.g., the circuit/module for segmenting 1728, the circuit/module for determining whether to segment 1722, the memory device 1708, or some other component).

The circuit/module for obtaining 1720 (e.g., a means for obtaining) may take various forms. In some aspects, the circuit/module for obtaining 1720 may correspond to, for example, a processing circuit as discussed herein. In some aspects, the circuit/module for obtaining 1720 may correspond to, for example, an interface (e.g., a bus interface, a receive interface, or some other type of signal interface), a communication device, a transceiver, a receiver, or some other similar component as discussed herein. In some implementations, the communication interface 1702 includes the circuit/module for obtaining 1720 and/or the code for obtaining 1734. In some implementations, the circuit/module for obtaining 1720 and/or the code for obtaining 1734 is configured to control the communication interface 1702 (e.g., a transceiver or a receiver) to communicate the information.

The circuit/module for determining whether to segment 1722 may include circuitry and/or programming (e.g., code for determining whether to segment 1736 stored on the storage medium 1704) adapted to perform several functions relating to, for example, determining whether to segment an information block. In some aspects, the circuit/module for determining whether to segment 1722 (e.g., a means for determining whether to segment) may correspond to, for example, a processing circuit.

Initially, the circuit/module for determining whether to segment 1722 obtains information upon which the determination is to be based. For example, the circuit/module for determining whether to segment 1722 may obtain information as discussed above in conjunction with FIGS. 6-13 (e.g., from the communication interface 1702, the memory device 1708, or some other component of the apparatus 1700). The circuit/module for determining whether to segment 1722 may then make the determination based on the obtained information. For example, the circuit/module for determining whether to segment 1722 may determine whether to segment based on at least one power mode of a satellite (e.g., segment if the satellite is or will be in a low power mode). As another example, the circuit/module for determining whether to segment 1722 may determine whether to segment based on at least one location of a satellite (e.g., segment if the satellite is or will be near a Polar region). The circuit/module for determining whether to segment 1722 may then output an indication of the determination (e.g., to the circuit/module for segmenting 1728, the memory device 1708, or some other component).

The circuit/module for determining a size 1724 may include circuitry and/or programming (e.g., code for determining a size 1738 stored on the storage medium 1704) adapted to perform several functions relating to, for example, determining a size for segments. In some aspects, the circuit/module for determining a size 1724 (e.g., a means for determining a size) may correspond to, for example, a processing circuit.

Initially, the circuit/module for determining a size 1724 obtains information upon which the determination is to be based. For example, the circuit/module for determining a size 1724 may obtain information as discussed above in conjunction with FIGS. 6-13 (e.g., from the communication interface 1702, the memory device 1708, or some other component of the apparatus 1700). The circuit/module for determining a size 1724 may then make the determination based on the obtained information. For example, the circuit/module for determining a size 1724 may determine a size for segments based on at least one criterion as discussed above in conjunction with FIGS. 6-13. The circuit/module for determining a size 1724 may then output an indication of the determined size (e.g., to the circuit/module for segmenting 1728, the memory device 1708, or some other component).

The circuit/module for determining a quantity 1726 may include circuitry and/or programming (e.g., code for determining a quantity 1740 stored on the storage medium 1704) adapted to perform several functions relating to, for example, determining a quantity of information windows for sending segments. In some aspects, the circuit/module for determining a quantity 1726 (e.g., a means for determining a quantity) may correspond to, for example, a processing circuit.

Initially, the circuit/module for determining a quantity 1726 obtains information upon which the determination is to be based. For example, the circuit/module for determining a quantity 1726 may obtain information as discussed above in conjunction with FIGS. 6-13 (e.g., from the communication interface 1702, the memory device 1708, or some other component of the apparatus 1700). The circuit/module for determining a quantity 1726 may then make the determination based on the obtained information. For example, the circuit/module for determining a quantity 1726 may determine a quantity of information windows for sending segments based on at least one criterion as discussed above in conjunction with FIGS. 6-13. The circuit/module for determining a quantity 1726 may then output an indication of the determined quantity (e.g., to the circuit/module for segmenting 1728, to the circuit/module for sending 1732, the memory device 1708, or some other component).

The circuit/module for segmenting 1728 may include circuitry and/or programming (e.g., code for segmenting 1742 stored on the storage medium 1704) adapted to perform several functions relating to, for example, segmenting an information block. In some aspects, the circuit/module for segmenting 1728 (e.g., a means for segmenting) may correspond to, for example, a processing circuit.

Initially, the circuit/module for segmenting 1728 obtains an indication of whether to segment (e.g., from the circuit/module for determining whether to segment 1722). If segmentation is indicated, the circuit/module for segmenting 1728 obtains the information block to be segmented. The circuit/module for segmenting 1728 may then segment information as discussed above in conjunction with FIGS. 6-13. The circuit/module for segmenting 1728 may then output the resulting segmented information (e.g., to the circuit/module for sending 1732, the memory device 1708, or some other component).

The circuit/module for encoding 1730 may include circuitry and/or programming (e.g., code for encoding 1744 stored on the storage medium 1704) adapted to perform several functions relating to, for example, encoding information. In some aspects, the circuit/module for encoding 1730 (e.g., a means for encoding) may correspond to, for example, a processing circuit.

In some aspects, the circuit/module for encoding 1730 may execute an encoding algorithm on at least one input (e.g., segmented information obtained from the circuit/module for segmenting 1728, the memory device 1708, or some other component of the apparatus 1700). In some aspects, the circuit/module for encoding 1730 may perform one or more of the coding-related operations described above in conjunction with FIGS. 6-13. The circuit/module for encoding 1730 then outputs the resulting encoded information (e.g., to the circuit/module for sending 1732, the communication interface 1702, the memory device 1708, or some other component).

The circuit/module for sending 1732 may include circuitry and/or programming (e.g., code for sending 1746 stored on the storage medium 1704) adapted to perform several functions relating to, for example, sending (e.g., transmitting) information. In some implementations, the circuit/module for sending 1732 may obtain information (e.g., from the memory device 1708, or some other component of the apparatus 1700), process the information (e.g., encode the information for transmission), and send the information to another component (e.g., the transmitter 1714, the communication interface 1702, or some other component) that will transmit the information to another device. In some scenarios (e.g., if the circuit/module for sending 1732 includes a transmitter), the circuit/module for sending 1732 transmits the information directly to another device (e.g., the ultimate destination) via radio frequency signaling or some other type of signaling suitable for the applicable communication medium.

The circuit/module for sending 1732 (e.g., a means for sending) may take various forms. In some aspects, the circuit/module for sending 1732 may correspond to, for example, an interface (e.g., a bus interface, a send/receive interface, or some other type of signal interface), a communication device, a transceiver, a transmitter, or some other similar component as discussed herein. In some implementations, the communication interface 1702 includes the circuit/module for sending 1732 and/or the code for sending 1746. In some implementations, the circuit/module for sending 1732 and/or the code for sending 1746 is configured to control the communication interface 1702 (e.g., a transceiver or a transmitter) to transmit information.

Second Example Process

Figure 18:
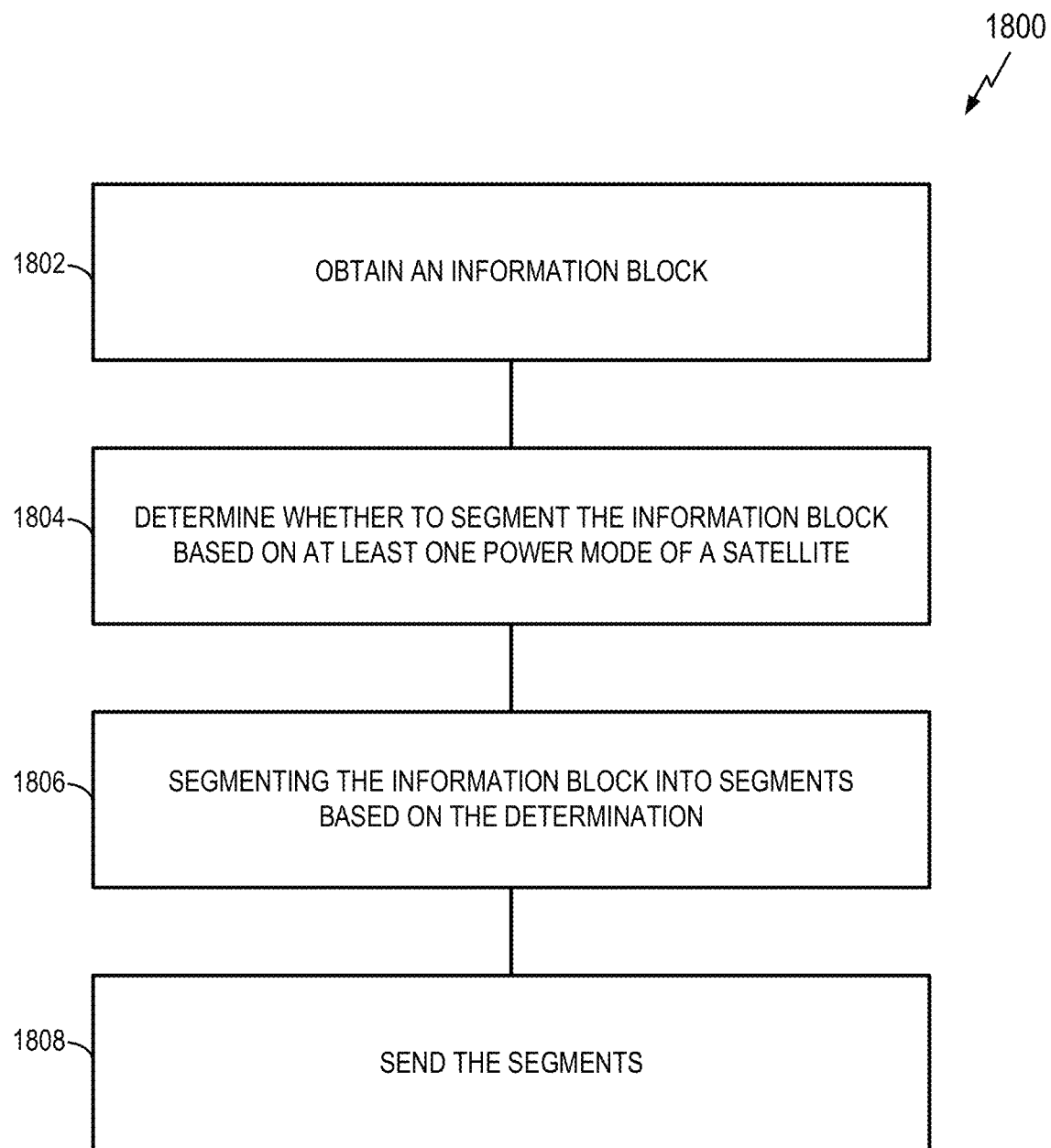
FIG. 18 is a flowchart illustrating an example segmentation process in accordance with some aspects of the disclosure.

FIG. 18 illustrates a process 1800 for communication in accordance with some aspects of the disclosure. The process 1800 may take place within a processing circuit (e.g., the processing circuit 1710 of FIG. 17), which may be located in a GN, a base station (BS), a UT, a user equipment (UE), a transmit receive point (TRP), a satellite network portal (SNP), or some other suitable apparatus. In some implementations, the process 1800 may be performed by an GN for at least one non-geosynchronous satellite. Of course, in various aspects within the scope of the disclosure, the process 1800 may be implemented by any suitable apparatus capable of supporting communication-related operations.

At block 1802, an apparatus (e.g., a GN) obtains an information block. The information block may include different information in different scenarios. In some aspects, the information block may include: a satellite neighbor cell list, ephemeris information, or any combination thereof.

In some implementations, the circuit/module for obtaining 1720 of FIG. 17 performs the operations of block 1802. In some implementations, the code for obtaining 1734 of FIG. 17 is executed to perform the operations of block 1802.

At block 1804, the apparatus determines whether to segment the information block based on at least one power mode of a satellite. In some aspects, the determination of whether to segment may include electing to segment if the satellite is in a reduced power mode.

In some implementations, the circuit/module for determining whether to segment 1722 of FIG. 17 performs the operations of block 1804. In some implementations, the code for determining whether to segment 1736 of FIG. 17 is executed to perform the operations of block 1804.

At block 1806, the apparatus segments the information block into segments based on the determination of block 1804. The segmentation may take different forms in different scenarios. In some aspects, the segmentation may be across broadcast information windows. In some aspects, the segmentation may be across packet boundaries. In some aspects, the segmentation may be across sub-frames.

In some implementations, the circuit/module for segmenting 1728 of FIG. 17 performs the operations of block 1806. In some implementations, the code for segmenting 1742 of FIG. 17 is executed to perform the operations of block 1806.

At block 1808, the apparatus sends the segments. Various types of information may be sent with (e.g., in) the segments as discussed herein and in conjunction with the process 2000 of FIG. 20.

In some implementations, the circuit/module for sending 1732 of FIG. 17 performs the operations of block 1808. In some implementations, the code for sending 1746 of FIG. 17 is executed to perform the operations of block 1808.

In some aspects, an apparatus may perform any of the operations discussed above for FIG. 18, or any combination thereof.

Third Example Process

Figure 19:
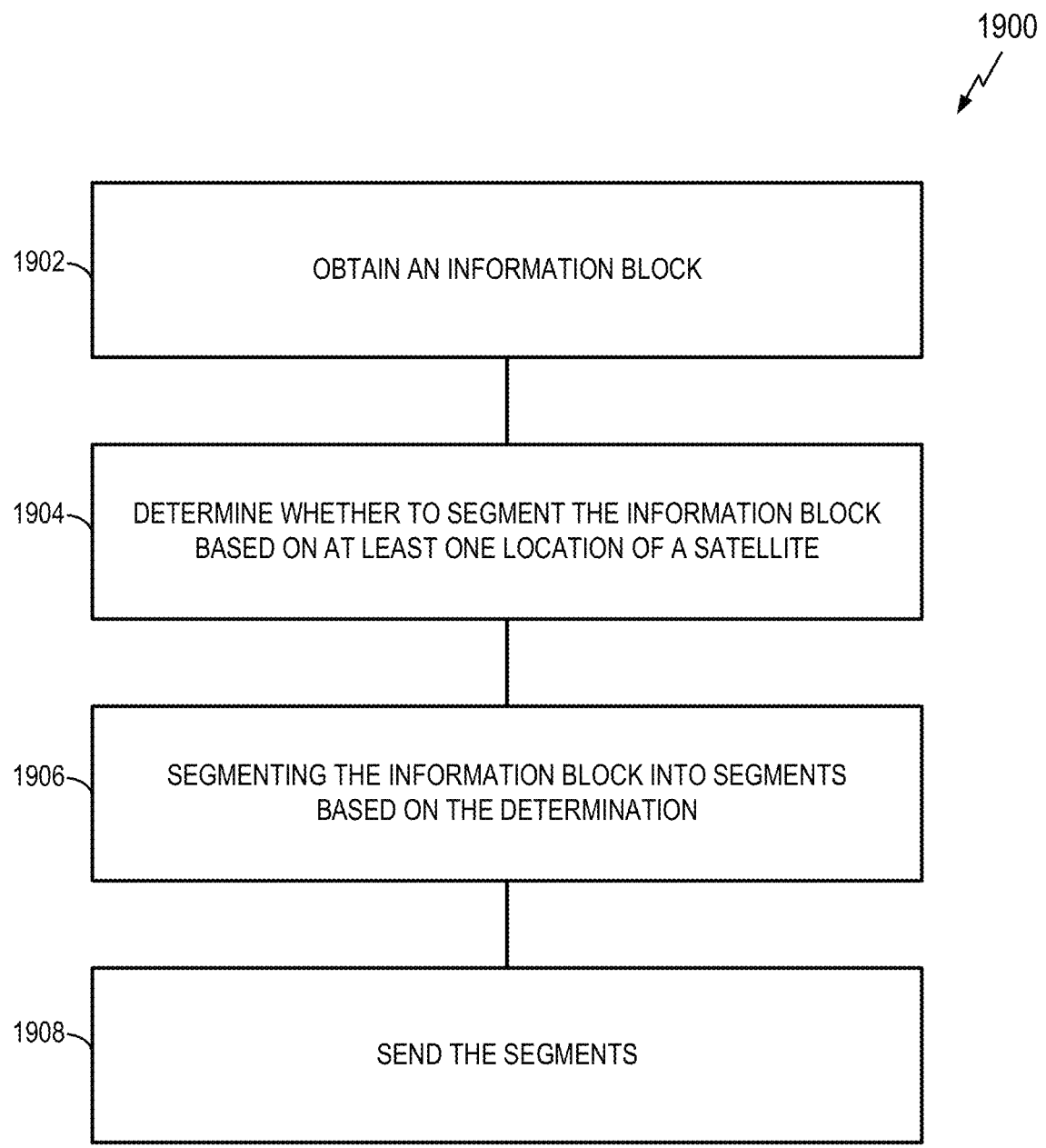
FIG. 19 is a flowchart illustrating another example segmentation process in accordance with some aspects of the disclosure.

FIG. 19 illustrates a process 1900 for communication in accordance with some aspects of the disclosure. The process 1900 may take place within a processing circuit (e.g., the processing circuit 1710 of FIG. 17), which may be located in a GN, a base station (BS), a UT, a user equipment (UE), a transmit receive point (TRP), a satellite network portal (SNP), or some other suitable apparatus. In some implementations, the process 1900 may be performed by an GN for at least one non-geosynchronous satellite. Of course, in various aspects within the scope of the disclosure, the process 1900 may be implemented by any suitable apparatus capable of supporting communication-related operations.

At block 1902, an apparatus (e.g., a GN) obtains an information block. The information block may include different information in different scenarios. In some aspects, the information block may include: a satellite neighbor cell list, ephemeris information, or any combination thereof.

In some implementations, the circuit/module for obtaining 1720 of FIG. 17 performs the operations of block 1902. In some implementations, the code for obtaining 1734 of FIG. 17 is executed to perform the operations of block 1902.

At block 1904, the apparatus determines whether to segment the information block based on at least one location of a satellite. The location of a satellite may correspond to different scenarios.

In some aspects, the at least one location corresponds to at least one Polar region (e.g., the North Pole and/or the South Pole of the Earth). In some aspects, the determination of whether to segment may include electing to segment if the satellite is near (e.g., within a threshold distance of) at least one Polar region.

In some aspects, the at least one location corresponds to an area where neighboring satellite trajectories are in substantially opposite directions (e.g., a "seam" area). In some aspects, the determination of whether to segment may include electing to segment if the satellite is near (e.g., within a threshold distance of) an area where neighboring satellite trajectories are in substantially opposite directions.

In some implementations, the circuit/module for determining whether to segment 1722 of FIG. 17 performs the operations of block 1904. In some implementations, the code for determining whether to segment 1736 of FIG. 17 is executed to perform the operations of block 1904.

At block 1906, the apparatus segments the information block into segments based on the determination of block 1904. The segmentation may take different forms in different scenarios. In some aspects, the segmentation may be across broadcast information windows. In some aspects, the segmentation may be across packet boundaries. In some aspects, the segmentation may be across sub-frames.

In some implementations, the circuit/module for segmenting 1728 of FIG. 17 performs the operations of block 1906. In some implementations, the code for segmenting 1742 of FIG. 17 is executed to perform the operations of block 1906.

At block 1908, the apparatus sends the segments. Various types of information may be sent with (e.g., in) the segments as discussed herein and in conjunction with the process 2000 of FIG. 20.

In some implementations, the circuit/module for sending 1732 of FIG. 17 performs the operations of block 1908. In some implementations, the code for sending 1746 of FIG. 17 is executed to perform the operations of block 1908.

In some aspects, an apparatus may perform any of the operations discussed above for FIG. 19, or any combination thereof.

Fourth Example Process

Figure 20:
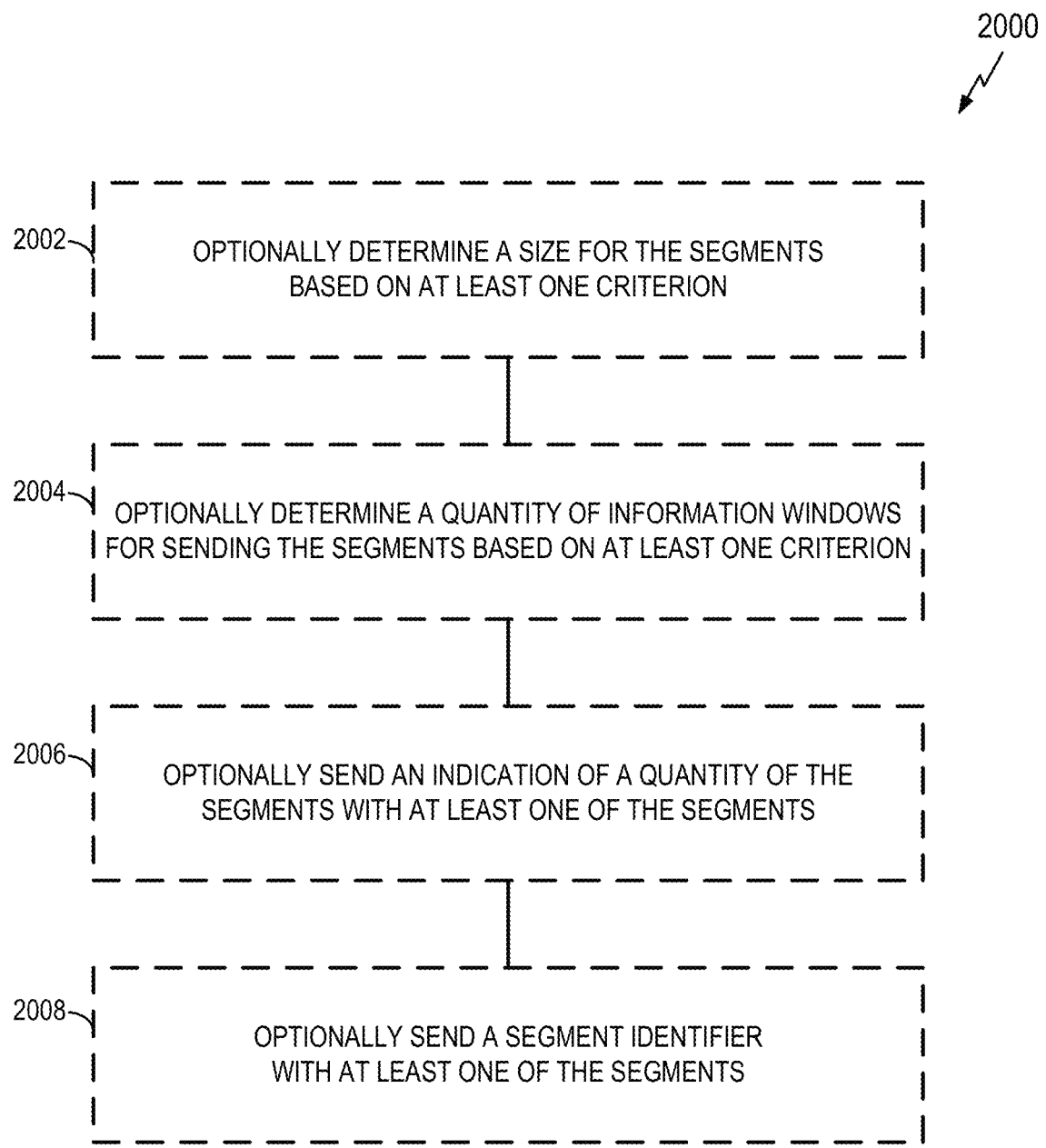
FIG. 20 is a flowchart illustrating example segmentation process operations in accordance with some aspects of the disclosure.

FIG. 20 illustrates a process 2000 for communication in accordance with some aspects of the disclosure. One or more aspects of the process 2000 may be used in conjunction with (e.g., in addition to or as part of) the process 1800 of FIG. 18 or the process 1900 of FIG. 19. The process 2000 may take place within a processing circuit (e.g., the processing circuit 1710 of FIG. 17), which may be located in a GN, a base station (BS), a UT, a user equipment (UE), a transmit receive point (TRP), a satellite network portal (SNP), or some other suitable apparatus. In some implementations, the process 2000 may be performed by an GN for at least one non-geosynchronous satellite. Of course, in various aspects within the scope of the disclosure, the process 2000 may be implemented by any suitable apparatus capable of supporting communication-related operations.

At optional block 2002, an apparatus (e.g., a GN) may determine a size for the segments based on at least one criterion. In some aspects, the at least one criterion may include: at least one power mode of the satellite, at least one location of the satellite, an allocated window size, an allocated bandwidth, a size of the information block, or any combination thereof.

In some implementations, the circuit/module for determining a size 1724 of FIG. 17 performs the operations of block 2002. In some implementations, the code for determining a size 1738 of FIG. 17 is executed to perform the operations of block 2002.

At optional block 2004, the apparatus may determine a quantity of information windows for sending the segments based on at least one criterion. In some aspects, the at least one criterion may include: at least one power mode of the satellite, at least one location of the satellite, an allocated window size, an allocated bandwidth, a size of the information block, or any combination thereof.

In some implementations, the circuit/module for determining a quantity 1726 of FIG. 17 performs the operations of block 2004. In some implementations, the code for determining a quantity 1740 of FIG. 17 is executed to perform the operations of block 2004.

At optional block 2006, the apparatus may send an indication of a quantity of the segments. For example, this indication may be sent with at least one of the segments.

In some implementations, the circuit/module for sending 1732 of FIG. 17 performs the operations of block 2006. In some implementations, the code for sending 1746 of FIG. 17 is executed to perform the operations of block 2006.

At optional block 2008, the apparatus may send a segment identifier. For example, this indication may be sent with at least one of the segments.

In some implementations, the circuit/module for sending 1732 of FIG. 17 performs the operations of block 2008. In some implementations, the code for sending 1746 of FIG. 17 is executed to perform the operations of block 2008.

In some aspects, an apparatus may perform any of the operations discussed above for FIG. 20, or any combination thereof.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the disclosure are described in the description and related drawings directed to specific examples. Alternate examples may be devised without departing from the scope of the disclosure. Additionally, well-known elements might not have been described in detail or may have been be omitted so as not to obscure the relevant details of the disclosure.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

The teachings herein can be implemented according to various network technologies including, without limitation, fifth generation (5G) technology, fourth generation (4G) technology, third generation (3G) technology, satellite technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard used will depend on the specific application and the overall design constraints imposed on the system. For purposes of illustration, the following may describe various aspects in the context of a 5G system or an LTE system. It should be appreciated, however, that the teachings herein may be used in other systems as well. Thus, references to functionality in the context of 5G or LTE terminology should be understood to be equally applicable to other types of technology, networks, components, signaling, and so on.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

The invention claimed is:

1. A method of communication, comprising:
obtaining an information block;
determining whether to segment the information block based on at least one power mode of a satellite;
segmenting the information block into segments based on the determination; and
sending the segments.

2. The method of claim 1, wherein the determination of whether to segment comprises electing to segment if the satellite is in a reduced power mode.

3. The method of claim 1, further comprising:
determining a size for the segments based on at least one criterion.

4. The method of claim 3, wherein the at least one criterion comprises: the at least one power mode of the satellite, at least one location of the satellite, an allocated window size, an allocated bandwidth, a size of the information block, or any combination thereof.

5. The method of claim 1, further comprising:
determining a quantity of information windows for sending the segments based on at least one criterion.

6. The method of claim 5, wherein the at least one criterion comprises: the at least one power mode of the satellite, at least one location of the satellite, an allocated window size, an allocated bandwidth, a size of the information block, or any combination thereof.

7. The method of claim 1, further comprising:
sending an indication of a quantity of the segments with at least one of the segments.

8. The method of claim 1, further comprising:
sending a segment identifier with at least one of the segments.

9. The method of claim 1, wherein:
the segmentation is across broadcast information windows.

10. The method of claim 1, wherein:
the segmentation is across packet boundaries.

11. The method of claim 1, wherein:
the segmentation is across sub-frames.

12. The method of claim 1, wherein the information block comprises: a satellite neighbor cell list, ephemeris information, or any combination thereof.

13. An apparatus for communication comprising:
a memory; and
a processor coupled to the memory,
the processor and the memory configured to:
obtain an information block;
determine whether to segment the information block based on at least one power mode of a satellite;
segment the information block into segments based on the determination; and
send the segments.

14. The apparatus of claim 13, wherein the processor and the memory are further configured to:
determine a size for the segments based on at least one criterion.

15. A method of communication, comprising:
obtaining an information block;
determining whether to segment the information block based on at least one location of a satellite;
segmenting the information block into segments based on the determination; and
sending the segments.

16. The method of claim 15, wherein the at least one location corresponds to at least one Polar region.

17. The method of claim 15, wherein the determination of whether to segment comprises electing to segment if the satellite is near at least one Polar region.

18. The method of claim 15, wherein the at least one location corresponds to an area where neighboring satellite trajectories are in substantially opposite directions.

19. The method of claim 15, wherein the determination of whether to segment comprises electing to segment if the satellite is near an area where neighboring satellite trajectories are in substantially opposite directions.

20. The method of claim 15, further comprising:
determining a size for the segments based on at least one criterion.

21. The method of claim 20, wherein the at least one criterion comprises: the at least one location of the satellite, at least one power mode of the satellite, an allocated window size, an allocated bandwidth, a size of the information block, or any combination thereof.

22. The method of claim 15, further comprising:
determining a quantity of information windows for sending the segments based on at least one criterion.

23. The method of claim 22, wherein the at least one criterion comprises: the at least one location of the satellite, at least one power mode of the satellite, an allocated window size, an allocated bandwidth, a size of the information block, or any combination thereof.

24. The method of claim 15, further comprising:
sending an indication of a quantity of the segments with at least one of the segments.

25. The method of claim 15, further comprising:
sending a segment identifier with at least one of the segments.

26. The method of claim 15, wherein:
the segmentation is across broadcast information windows.

27. The method of claim 15, wherein:
the segmentation is across packet boundaries.

28. The method of claim 15, wherein:
the segmentation is across sub-frames.

29. The method of claim 15, wherein the information block comprises: a satellite neighbor cell list, ephemeris information, or any combination thereof.

30. An apparatus for communication comprising:
a memory; and
a processor coupled to the memory,
the processor and the memory configured to:
obtain an information block;
determine whether to segment the information block based on at least one location of a satellite;
segment the information block into segments based on the determination; and
send the segments.

* * * * *